(12) United States Patent
Fartukov et al.

(10) Patent No.: US 9,615,089 B2
(45) Date of Patent: Apr. 4, 2017

(54) METHOD OF ENCODING AND DECODING MULTIVIEW VIDEO SEQUENCE BASED ON ADAPTIVE COMPENSATION OF LOCAL ILLUMINATION MISMATCH IN INTER-FRAME PREDICTION

(71) Applicant: SAMSUNG ELECTRONICS CO., LTD., Suwon-si (KR)

(72) Inventors: Alexey Mikhailovich Fartukov, Moscow (RU); Igor Mironovich Kovliga, Moscow (RU); Michael Naumovich Mishourovsky, Moscow (RU); Byung Tae Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 14/140,183

(22) Filed: Dec. 24, 2013

(65) Prior Publication Data

US 2014/0177712 A1 Jun. 26, 2014

(30) Foreign Application Priority Data

Dec. 26, 2012 (RU) .................................. 2012157008
Nov. 19, 2013 (KR) ........................ 10-2013-0140504

(51) Int. Cl.
| | |
|---|---|
| *H04N 19/86* | (2014.01) |
| *H04N 19/597* | (2014.01) |
| *H04N 19/196* | (2014.01) |
| *H04N 19/117* | (2014.01) |
| *H04N 19/137* | (2014.01) |
| *H04N 19/186* | (2014.01) |

(52) U.S. Cl.
CPC ..... *H04N 19/00769* (2013.01); *H04N 19/117* (2014.11); *H04N 19/137* (2014.11); *H04N 19/186* (2014.11); *H04N 19/196* (2014.11); *H04N 19/597* (2014.11); *H04N 19/86* (2014.11)

(58) Field of Classification Search
CPC ........... H04N 19/00769; H04N 19/117; H04N 19/186; H04N 19/196; H04N 19/597; H04N 19/86
See application file for complete search history.

(56) References Cited

U.S. PATENT DOCUMENTS

| | | | |
|---|---|---|---|
| 6,934,331 B2 | 8/2005 | Kamikura et al. | |
| 8,295,634 B2 * | 10/2012 | Lee ..................... | H04N 19/597 382/238 |
| 2008/0130750 A1 * | 6/2008 | Song .................... | H04N 19/176 375/240.16 |
| 2009/0123066 A1 | 5/2009 | Moriya et al. | |
| 2010/0027881 A1 | 2/2010 | Kim et al. | |

(Continued)

*Primary Examiner* — Christopher S Kelley
*Assistant Examiner* — Deirdre Beasley
(74) *Attorney, Agent, or Firm* — NSIP Law

(57) ABSTRACT

A technology for processing digital signals is provided, and more particularly, a method of encoding or decoding a multiview video sequence based on adaptive compensation of local illumination mismatches between frames of the multiview video sequence is provided. The method may be performed using a correction parameter used to correct a change in illumination. The correction parameter may be computed based on at least one of a first estimate estDi,j, a second estimate estRi,j, a value Ri,j of a pixel of a reference block, and values TDk and TRk of restored pixels.

20 Claims, 11 Drawing Sheets

(56) References Cited

U.S. PATENT DOCUMENTS

| | | |
|---|---|---|
| 2010/0183068 A1 | 7/2010 | Pandit et al. |
| 2010/0232507 A1* | 9/2010 | Cho .................... H04N 19/597 375/240.16 |
| 2010/0290532 A1* | 11/2010 | Yamamoto ........... H04N 19/176 375/240.16 |
| 2011/0170591 A1 | 7/2011 | Li et al. |
| 2012/0027291 A1 | 2/2012 | Shimizu et al. |
| 2012/0314776 A1 | 12/2012 | Shimizu et al. |

\* cited by examiner

METHOD OF ENCODING AND DECODING MULTIVIEW VIDEO SEQUENCE BASED ON ADAPTIVE COMPENSATION OF LOCAL ILLUMINATION MISMATCH IN INTER-FRAME PREDICTION

CROSS-REFERENCE TO RELATED APPLICATIONS

This application claims the priority benefit of Russian Patent Application No. 2012157008, filed on Dec. 26, 2012, in the Russian Federal Service for Intellectual Property, and Korean Patent Application No. 10-2013-0140504, filed on Nov. 19, 2013, in the Korean Intellectual Property Office, the entire disclosures of which are incorporated herein by reference for all purposes.

BACKGROUND

1. Field

Example embodiments of the following description relate to a technology of processing digital signals in a computer system, and more particularly, to a method and system for correcting illumination mismatches that appear between frames of a multiview video sequence.

2. Description of the Related Art

A method of encoding a multiview video sequence, using frames belonging to adjacent views (that is, adjacent foreshortenings), and frames synthesized using the frames belonging to the adjacent views and depth maps is being utilized. The above frames are represented as reference frames, during encoding with prediction. A possible displacement of an object in a current frame associated with one of the reference frames may be removed. A distinction in an object position between a current encoded frame and the frames belonging to the adjacent views, or a motion of the object, or the synthesized frames may be understood as a displacement. To minimize a distance between frames, a specified displacement may be removed. An obtained inter-frame difference may be encoded, for example, by performing decorrelated conversion, quantization, and entropy encoding, and may be placed in an output bitstream.

Possible distinctions in parameters of cameras used to shoot multiview video sequences, and a distinction in a light flux arriving from objects captured by cameras may lead to a local illumination mismatch between frames belonging to different foreshortenings. Additionally, the local illumination mismatch may have an influence on characteristics of synthesized frames. An absolute value of an inter-frame difference that negatively affects an encoding efficiency may be increased.

SUMMARY

The foregoing and/or other aspects are achieved by providing a method of adaptively compensating for a local illumination mismatch in inter-frame prediction during encoding and decoding of a multiview video sequence, the method being performed by a computer system, and including obtaining a value of a pixel of a current encoded block included in an encoded frame, and a value of a pixel of a reference block included in a reference frame, obtaining values of pixels restored by encoding and then decoding, from a vicinity of the current encoded block, and from a vicinity of the reference block, excluding from consideration a pixel included in the vicinity of the current encoded block and a pixel included in the vicinity of the reference block, the pixels being estimated to be unreliable for computation of a correction parameter used to correct a change in illumination by at least one preset criterion, determining a numerical ratio between pixels of the reference block, a numerical ratio between reliable pixels located in the vicinity of the current encoded block, and a numerical ratio between reliable pixels located in the vicinity of the reference block, computing the correction parameter, based on the determined numerical ratios considering an initial value, and estimating a change in values of pixels of the reference block, wherein, when the change is estimated to be essential, the values of the pixels of the reference block are corrected using the computed correction parameter.

A procedure including the determining of the numerical ratios, the computing of the correction parameter, and the estimating of the change may include detecting an adjacent vicinity of the current encoded block, and an adjacent vicinity of the reference block so that pixels included in the vicinities are already restored, computing at least one of a first estimate $estD_{i,j}$ and a second estimate $estR_{i,j}$ for each of positions (i, j) of pixels in the reference block, based on a value $T^D_k$ of a restored pixel obtained from a specified adjacent vicinity of the current encoded frame, and a value $T^R_k$ of a pixel obtained from a predefined adjacent vicinity of the reference block, k having a value of "0" to "N−1," N indicating a number of pixels obtained from the specified adjacent vicinity of the current encoded block, and the number of the pixels being equal to a number of pixels obtained from a specified adjacent vicinity of the reference block, computing the correction parameter for each of the positions of the pixels in the reference block, based on at least one of the first estimate $estD_{i,j}$, the second estimate $estR_{i,j}$, a value $R_{i,j}$ of a pixel of the reference block, the value $T^D_k$ of the restored pixel, and the value $T^R_k$ of the pixel, and correcting the values of the pixels of the reference block, using the correction parameter.

A procedure including the computing of the at least one of the first estimate and the second estimate, and the computing of the correction parameter may include setting an initial value BaseD for the first estimate, and an initial value BaseR for the second estimate so that both the initial values BaseD and BaseR are nonnegative or nonpositive numbers, computing a weight coefficient $W_k(i,j)$ based on an intensity of a pixel of the reference block in a position (i,j), and an intensity of a pixel with an index k from a preset adjacent vicinity of the reference block, computing the first estimate based on $estD_{i,j}=BaseD+\Sigma_{k=0 \ldots N-1} W_k(i,j) \times T^D_k$, computing the second estimate based on $estR_{i,j}=BaseR+\Sigma_{k=0 \ldots N-1} W_k(i,j) \times T^R_k$, computing the correction parameter to be $$\alpha_{i,j} = \frac{estD_{i,j}}{estR_{i,j}},$$

when the second estimate is not equal to zero, and setting the correction parameter $\alpha_{i,j}$ to "1," when the second estimate is equal to zero, and correcting illumination of the reference block by multiplication of the value $R_{i,j}$ of each of the pixels of the reference block on a corresponding correction parameter $\alpha_{i,j}$, when the correction parameter $\alpha_{i,j}$ is not equal to "1."

The procedure including the computing of the at least one of the first estimate and the second estimate, and the computing of the correction parameter may further include setting an initial value BaseD for the first estimate, and an initial value BaseR for the second estimate so that both the initial values BaseD and BaseR are nonnegative or nonpositive numbers, computing a weight coefficient $W_k(i,j)$ based on an intensity of a pixel of the reference block in a position $(i,j)$, and an intensity of a pixel with an index k from a vicinity of the reference block, computing a second set of weight coefficients $L_k(i,j)$ based on a pixel position $(i,j)$ and the index k, computing the first estimate based on $estD_{i,j}=BaseD+\Sigma_{k=0\ldots N-1} W_k(i,j)\times L_K(i,j)\times T^D_k$, and computing the second estimate based on $$estR_{i,j}=BaseR+\Sigma_{k=0\ldots N-1}W_k(i,j)\times L_K(i,j)\times T^R_k.$$

The correction parameter $\alpha_{i,j}$ may be represented by a nonnegative integer, and may be used to compute correction of each of the values of the pixels of the reference block by minimum multiplication of a value of each of pixels on the correction parameter and a bit displacement to the right on a preset nonnegative integer.

The computing of the at least one of the first estimate and the second estimate may include computing a weight coefficient $W_k(i,j)$ for each of the positions $(i,j)$ of the pixels in the reference block, the weight coefficient $W_k(i,j)$ being a nonincreasing function from an absolute difference $|R_{i,j}-T_k^R|$ that provides an inversely proportional increase and/or decrease in $W_k(i,j)$ depending from a decrease and/or an increase in the absolute difference.

The computing of the at least one of the first estimate and the second estimate may include computing a weight coefficient $W_k(i,j)$ for each of the positions $(i,j)$ of the pixels in the reference block, the weight coefficient $W_k(i,j)$ being a nonincreasing function from an absolute difference $|R_{i,j}-T_k^R|$ that provides an inversely proportional decrease and/or increase in $W_k(i,j)$ depending from a decrease and/or an increase in the absolute difference, and computing a second set of weight coefficients $L_k(i,j)$ for the first estimate $estD_{i,j}$ and for the second estimate $estR_{i,j}$ for each of the positions $(i, j)$ of the pixels in the reference block so that the second set of the weight coefficients $L_k(i,j)$ is equal to a nonincreasing function $f$ of a distance between pixels $\|R_{i,j},T_K^R\|$: $L_K(i,j)=f(\|R_{i,j},T_K^R\|)$, the nonincreasing function $f$ providing an inversely proportional increase and/or decrease in a value $L_k(i,j)$ based on whether the value $T^R_k$ of the pixel approaches or moves away from a value $R_{i,j}$ of a corrected pixel.

Prior to the computing of the weight coefficient $W_k(i,j)$, the computing of the at least one of the first estimate and the second estimate may include checking a first condition of reliability of a pixel $|T_k^R-T_k^D|\geq Thr1$, Thr1 denoting a first predetermined threshold, checking a second condition of reliability of a pixel $|T_k^R-R_{i,j}|\leq Thr2$, Thr2 denoting a second predetermined threshold, and excluding from further computations the pixels $T^R_k$ and $T^D_k$, the pixels $T^R_k$ and $T^D_k$ being estimated to be unreliable for computation in case of non-compliance with, at least, one of the first and second conditions of reliability.

The computing of the at least one of the first estimate and the second estimate may include setting a value of the weight coefficient $W_k(i,j)$ for the first estimate $estD_{i,j}$ and for the second estimate $estR_{i,j}$ to be "1" for each of the positions $(i, j)$ of the pixels in the reference block for all positions k, the pixels $T^R_k$ and $T^D_k$ being estimated to be reliable.

The computing of the at least one of the first estimate and the second estimate may include computing a weight coefficient $W_k(i,j)$, so that the weight coefficient $W_k(i,j)$ is equal to $$W_k(i,j) = e^{(-C1\cdot A_k(i,j)^{C2}+C3)},$$

C1, C2, and C3 denoting parameters setting nonlinear dependence of a weight coefficient from a value $A_k(i,j)$ that is equal to $A_k(i,j)=|R_{i,j}-T_k^R|$.

The weight coefficient $W_k(i,j)$ may be computed as $$W_K(i,j) = e^{-C1(\|R_{i,j},T_K^R\|)\times A_K(i,j)^{C2(\|R_{i,j},T_K^R\|)}+C3(\|R_{i,j},T_K^R\|)},$$

in which $C1(\|R_{i,j},T_K^R\|)$, $C2(\|R_{i,j},T_K^R\|)$, and $C3(\|R_{i,j},T_K^R\|)$ denote parameters that functionally depend on a distance $\|R_{i,j},T_K^R\|$, and $A_k(i,j)=|R_{i,j}-T_k^R|$.

A position of the adjacent vicinity of the current encoded block, and a position of the adjacent vicinity of the reference block may be detected adaptively, instead of being initially set.

The computing of at least one of the first estimate $estD_{i,j}$ and the second estimate $estR_{i,j}$ may include performing preliminary resampling down of some pixels located in a preset adjacent vicinity of the current encoded block, and some pixels located in the preset adjacent vicinity of the reference block, wherein the part of the pixels located in the preset adjacent vicinity of the current encoded block corresponds to the part of the pixels located in the preset adjacent vicinity of the reference block.

The excluding of the pixels may include composing pairs $(T_k^R,T_k^D)$ that are unambiuously set by a number of pixels k, using all already restored pixels $T^R_k$ and all already restored pixels $T^D_k$, the pairs being grouped in M non-overlapping groups G0 to GM-1, such that $(T_k^R,T_k^D)$, $k=0\ldots N-1 \in \{G_0 \cap G_1 \cap \ldots \cap G_{M-1}\}$, wherein pairs of the pixels belonging to a group Gi are designated as $\{(T_{ki}^R, T_{ki}^D)\in Gi\}$, computing, for each group Gi, a matrix based on registration of pixel distinctions $T_{ki}^R$ and $T_{ki}^D$, except a distinction between an average value of all pixels $T_{ki}^R$ and an average value of all pixels $T_{ki}^D$ of each group Gi, computing, for each group Gi, a matrix based on the distinction between the average value of all the pixels $T_{ki}^R$ and the average value of all the pixels $T_{ki}^D$ of each group Gi, computing a common matrix designated as MR_Norm, for the groups G0 to GM-1, based on the registration of the pixel distinctions $T_{ki}^R$ and $T_{ki}^D$, except the distinction between the average value of all the pixels $T_{ki}^R$ and the average value of all the pixels $T_{ki}^D$ of each group Gi, computing a common matrix designated as M_Norm, for the groups G0 to GM-1, based on registration of the distinction between the average value of all the pixels $T_{ki}^R$ and the average value of all the pixels $T_{ki}^D$ of each group Gi, and comparing the computed matrices MR_Norm and M_Norm, using a preset threshold, wherein, when the matrix MR_Norm is greater than a first set threshold, or the matrix M_Norm is less than a second set threshold, all pixels obtained from an adjacent vicinity of the reference block, and all pixels obtained from an adjacent vicinity of the current encoded block are considered to be unreliable.

For each group Gi, a matrix MR_Norm(Gi) may be computed based on the registration of the pixel distinctions $T_{ki}^R$ and $T_{ki}^D$, except the distinction between the average value of all the pixels $T_{ki}^R$ and the average value of all the pixels $T_{ki}^D$ of each group Gi, using the following Equation 1:

$$MR\_Norm(G_i) = \sum_{(T_{ki}^R, T_{ki}^D) \in Gi} \left( \left| T_{ki}^R - T_{ki}^D - \frac{\sum_{(T_{ki}^R, T_{ki}^D) \in Gi} T_{ki}^R}{|Gi|} + \frac{\sum_{(T_{ki}^R, T_{ki}^D) \in Gi} T_{ki}^D}{|Gi|} \right|^{P1} \right)$$ [Equation 1]

In Equation 1, a value of a degree factor P1 may be experimentally determined.

For each group Gi, a matrix M_Norm(Gi) may be computed based on the distinction between the average value of all the pixels $T_{ki}^R$ and the average value of all the pixels $T_{ki}^D$ of each group Gi, using the following Equation 2:

$$M\_Norm(G_i) = \sum_{(T_{ki}^R, T_{ki}^D) \in Gi} \left( \left| \frac{\sum_{(T_{ki}^R, T_{ki}^D) \in Gi} T_{ki}^R}{|Gi|} - \frac{\sum_{(T_{ki}^R, T_{ki}^D) \in Gi} T_{ki}^D}{|Gi|} \right|^{P2} \right)$$ [Equation 2]

In Equation 2, a value of a degree factor P2 may be experimentally determined.

The common matrix, designated as MR_Norm, may be computed for the groups G0 to GM−1, based on the registration of the pixel distinctions $T_{ki}^R$ and $T_{ki}^D$, except the distinction between the average value of all the pixels $T_{ki}^R$ and the average value of all the pixels $T_{ki}^D$ of each group Gi, using the following Equation 3:

$$MR\_Norm = \sum_{i=0 \ldots M-1} MR\_Norm(G_i)$$ [Equation 3]

The common matrix, designated as M_Norm, may be computed for the groups G0 to GM−1, based on the registration of the distinction between the average value of all the pixels $T_{ki}^R$ and the average value of all the pixels $T_{ki}^D$ of each group Gi, using the following Equation 4:

$$M\_Norm = \sum_{i=0 \ldots M-1} M\_Norm(G_i)$$ [Equation 4]

Unreliable pixels $T_k^R$ may be excluded from the specified adjacent vicinity of the reference block, and restored pixels $T_k^D$ may be excluded from the specified adjacent vicinity of the current encoded block. For all the pixels $T_k^R$ satisfying conditions "$T_k^R > LR_i$" and "$T_k^R < LR_{i+1}$," the pixels $T_k^D$ corresponding to the pixels $T_k^R$ based on their serial number k and spatial position in the reference frame and encoded frame may be composed in a group designated as $B(LR_i, LR_{i+1})$ represented as $$B(LR_i, LR_{i+1}) = \left\{ T_k^D \underset{k=0 \ldots N-1}{} : T_k^R > LR_i \bigwedge T_k^R < LR_{i+1} \right\}.$$

Values $LR_i$ and $LR_{i+1}$ may be used to determine band limits that set the group $B(LR_i, LR_{i+1})$, and may satisfy conditions "$LR_i > -1$" and "$LR_{i+1} > R_i$", and a number $N_B$ of groups $B(LR_i, LR_{i+1})$ may be used to set a largest possible value of an index i, used at indexing of values "$(LR_i, LR_{i+1})$: $-1 < LR_0 < LR_0 < LR_0 \ldots < LR_{NB}$." For each group $B(LR_i, LR_{i+1})$ set by values $LR_i$ and $LR_{i+1}$, values of the following Equation 5 may be computed:

$$C\_Plus(LRi, LRi+1) = \sum_{T_k^D \in B(LRi, LRi+1)} \begin{cases} 1, T_k^R \geq T_k^D + Thr5 \\ 0, T_k^R < T_k^D + Thr5 \end{cases}$$ [Equation 5]

$$C\_Minus(LRi, LRi+1) = \sum_{T_k^D \in B(LRi, LRi+1)} \begin{cases} 1, T_k^R \leq T_k^D - Thr5 \\ 0, T_k^R > T_k^D - Thr5 \end{cases}$$

In Equation 5, Thr5 denotes a preset adaptive threshold or a detected adaptive threshold during frame processing. Correctness of the following three conditions may be checked for each pixel $T_k^D \in B(LRi, LRi+1)$ of the group $B(LR_i, LR_{i+1})$:

$|C\_Plus(LR_i, LR_{i+1}) - C\_Minus(LR_i, LR_{i+1})| < Thr6;$   Condition 1

$C\_Plus(LR_i, LR_{i+1}) - C\_Minus(LR_i, LR_{i+1}) >= Thr6$ AND
$T_k^R \geq T_k^D + Thr5;$ and   Condition 2

$C\_Plus(LR_i, LR_{i+1}) - C\_Minus(LR_i, LR_{i+1}) <= -Thr6$
AND $T_k^R \leq T_k^D - Thr5$   Condition 3

When at least one of the checked conditions 1 to 3 is correct for a next considered pixel $T_k^D \in B(LRi, LRi+1)$, the considered pixel $T_k^D \in B(LRi, LRi+1)$ may be considered to be reliable.

For all the pixels $T_k^R$ satisfying conditions "$T_k^R > LR_i$" and "$T_k^R < LR_{i+1}$," the pixels $T_k^D$ corresponding to the pixels $T_k^R$ based on their serial number k and spatial position in the reference frame and encoded frame may be composed in a group designated as $B(LRi, LRi+1)$ represented as $$B(LR_i, LR_{i+1}) = \left\{ T_k^D \underset{k=0 \ldots N-1}{} : T_k^R > LR_i \bigwedge T_k^R < LR_{i+1} \right\}.$$

Values $LR_i$ and $LR_{i+1}$ may be used to determine band limits that set the group $B(LR_i, LR_{i+1})$, and may satisfy conditions "$LR_i > -1$" and "$LR_{i+1} > R_i$", and a number $N_B$ of groups $B(LR_i, LR_{i+1})$ may be used to set a largest possible value of an index i, used at indexing of values $(LR_i, LR_{i+1})$: $-1 < LR_0 < LR_0 < LR_0 \ldots < LR_{NB}$.

For all the pixels $T_k^D$ in the group $B(LR_i, LR_{i+1})$, an average value $Mean(B(LR_i, LR_{i+1}))$ by the group $B(LR_i, LR_{i+1})$, and an average deviation $Dev(B(LR_i, LR_{i+1}))$ of values of pixels in the group $B(LR_i, LR_{i-1})$ may be computed.

The average value $Mean(B(LR_i, LR_{i+1}))$ may be computed by $$Mean(B(LR_i, LR_{i+1})) = \frac{\sum_{T_k^D \in B(LRi, LRi+1)} (T_k^D)}{|B(LR_i, LR_{i+1})|}$$

in which $|B(LR_i, LR_{i+1})|$ designates a number of pixels in the group $B(LR_i, LR_{i+1})$.

The average deviation $Dev(B(LR_i, LR_{i+1}))$ may be computed by $$Dev(B(LR_i, LR_{i+1})) = \sqrt{\frac{\sum_{T_k^D \in B(LR_i, LR_{i+1})} (T_k^D - \text{Mean}(B(LR_i, LR_{i+1})))^2}{|B(LR_i, LR_{i+1})|}}.$$

When a difference modulus between a value of the next considered pixel $T^D_k \in B(LRi, LRi+1)$ of the group $B(LR_i, LR_{i+1})$ and an average value by the group $B(LR_i, LR_j)$ is greater than the average deviation $Dev(B(LR_i, LR_{i+1}))$, the considered pixel $T^D_k \in B(LRi, LRi+1)$ may be determined to be unreliable. The average deviation $Dev(B(LR_i, LR_{i+1}))$ may be multiplied by a value greater than zero, and may set jointly admissible dispersion in the group $B(LR_i, LR_{i+1})$.

The average deviation $Dev(B(LR_i, LR_{i+1}))$ may be computed by the following Equation 6:

$$Dev(B(LR_i, LR_j)) = \frac{\sum_{T_k^D \in B(LR_i, LR_j)} |T_k^D - \text{Mean}(B(LR_i, LR_j))|}{|B(LR_i, LR_j)|} \quad \text{[Equation 6]}$$

The method may further include estimating a possible change of each of the values of the pixels in the reference block, based on a preset numerical criterion, and the first estimate $estD_{i,j}$ and the second estimate $estR_{i,j}$, the change being determined to be essential or unessential, depending on a computed value of a numerical criterion.

When the first estimate $estD_{i,j}$ and the second estimate $estR_{i,j}$ are computed so that equality is fulfilled: $\lfloor EstR_{i,j} + \Delta 1 \rfloor >> Qbits_1 = \lfloor EstD_{i,j} + \Delta 1 >> Qbits_1$ in which $Qbits_1$ and $\Delta 1$ are nonnegative integers, the correction parameter may be estimated to be unessential.

When the first estimate $estD_{i,j}$ and the second estimate $estR_{i,j}$ are computed so that equality is fulfilled: $(\lfloor |EstD_{i,j} - EstR_{i,j}| \rfloor \Delta 2) >> Qbits_2 = 0$, in which $Qbits_2$ and $\Delta 2$ are nonnegative integers, the correction parameter may be estimated to be unessential.

When the first estimate $estD_{i,j}$ and the second estimate $estR_{i,j}$ are computed so that inequality is fulfilled: $\Delta 3 \times EstR_{i,j} < EstD_{i,j} < \Delta 4 \times EstR_{i,j}$ in which $\Delta 3$ and $\Delta 4$ are preset nonnegative numbers, the correction parameter may be estimated to be unessential.

The foregoing and/or other aspects are achieved by providing a method of adaptively compensating for a local illumination mismatch in inter-frame prediction during encoding and decoding of a multiview video sequence, the method being performed by a computer system, and including obtaining a value of a pixel of a current encoded block included in an encoded frame, and a value of a pixel of a reference block included in a reference frame, obtaining values of pixels restored by encoding and then decoding, from a vicinity of the current encoded block, and from a vicinity of the reference block, excluding from consideration a pixel included in the vicinity of the current encoded block and a pixel included in the vicinity of the reference block, the pixels being estimated to be unreliable for computation of a correction parameter used to correct a change in illumination by at least one preset criterion, computing the correction parameter, using only reliable pixels, by considering an initial value, and estimating a change in values of pixels of the reference block, wherein, when the change is estimated to be essential, the values of the pixels of the reference block are corrected using the computed correction parameter.

The computing of the correction parameter may include computing at least one of a first estimate estD and a second estimate estR based on a restored value $T^D_k$ of a pixel obtained from the vicinity of the current encoded frame, and a value $T^R_k$ of a pixel obtained from the vicinity of the reference block, and determining a correction parameter used to correct a change in illumination of all pixels in the reference block based on the first estimate estD and the second estimate estR.

The computing of the at least one of the first estimate estD and the second estimate estR may include setting an initial value BaseD for the first estimate, and an initial value BaseR for the second estimate so that both the initial values BaseD and BaseR are nonnegative or nonpositive integers, computing the first estimate based on $$EstD = BaseD + \sum_{k=0\ldots N-1} T_k^D,$$

in which $T^D_k$ denotes a restored value of a pixel obtained from a specified adjacent vicinity of the current encoded block, and N denotes a number of pixels in a preset adjacent vicinity of the current encoded block, computing the second estimate based on $$EstR = BaseR + \sum_{k=0\ldots N-1} T_k^R,$$

in which $T^R_k$ denotes a value of a pixel obtained from a specified adjacent vicinity of the reference block, determining the correction parameter based on a ratio $$\alpha = \frac{estD}{estR},$$

when the initial value BaseR is equal to zero and the second estimate estR is not equal to zero, or when the initial value BaseR is not equal to zero, setting the correction parameter $\alpha$ to "1" when the initial value BaseR is equal to zero and the second estimate estR is equal to zero, and correcting illumination of the reference block by multiplication of a value $R_{i,j}$ of each of pixels of the reference block on a predetermined correction parameter $\alpha$ when the correction parameter $\alpha$ is not equal to "1."

The method may further include determining the vicinity of the current encoded block to be adjacent so that the vicinity of the current encoded block directly adjoins to the current encoded block, some pixels of the current encoded block being already restored, and determining the vicinity of the reference block to be adjacent so that the vicinity of the reference block directly surrounds the reference block, a part of the pixels of the reference block being already restored, a total number of the pixels of the reference block coinciding with a total number of pixels in a set vicinity of the current encoded block, and one-to-one correspondence being installed between pixels of the vicinity of the reference block and pixels of the vicinity of the current encoded block.

$$EstD = BaseD + \Sigma_{k=0\ldots N-1} T_k^D EstR = BaseR + \Sigma_{k=0\ldots N-1} T_k^R T_k^R, k=0,\ldots,N-1$$

A position of the vicinity of the current encoded block, and a position of the vicinity of the reference block may be detected adaptively, instead of adjacent allocations of vicinities set relative to appropriate blocks in the encoded frame and the reference frame.

The method may further include estimating a possible change of each of the values of the pixels in the reference block, based on a preset numerical criterion, and the first estimate estD and the second estimate estR, the change being defined to be essential or unessential, depending on a computed value of a numerical criterion.

When the first estimate estD and the second estimate estR are computed so that equality is fulfilled: $(EstR+\Delta 1)>>Qbits_1==(EstD+\Delta 1)>>Qbits_1$, in which $Qbits_1$ and $\Delta 1$ are nonnegative integers, the correction parameter may be estimated to be unessential.

When the first estimate estD and the second estimate estR are computed so that equality is fulfilled: $(|EstD-EstR+\Delta 2)>>Qbits_2==0$ in which $Qbits_2$ and $\Delta 2$ are nonnegative integers, the correction parameter may be estimated to be unessential.

When the first estimate estD and the second estimate estR are computed so that equality is fulfilled: $\Delta 3\times EstR \leq EstD \leq \Delta 4\times EstR$, in which $\Delta 3$ and $\Delta 4$ are nonnegative integers, the correction parameter may be estimated to be unessential.

The correction parameter α may be represented by a nonnegative integer, with a purpose of simplification so that correction of each of values of pixels is computed by minimum multiplication of each of values of pixels on the nonnegative integer, the nonnegative integer representing a correction parameter in view of all pixels of the reference block and a bit displacement to the right on other preset nonnegative integers.

The method may further include estimating pixels $T^D_k$ and $T^R_k$ to be unreliable, when inequality $|T^R_k - T^D_k| \leq Thr1$ is not fulfilled for a value of k from "0" to "N−1," a value Thr1 denoting a preset numerical threshold, and excluding from further computations the pixels $T^D_k$ and $T^R_k$ estimated to be unreliable.

The obtaining of the values of the restored pixels may include resampling down the pixels by a preset template.

The foregoing and/or other aspects are achieved by providing a method of encoding a multiview video sequence based on adaptive compensation of a local illumination mismatch in inter-frame prediction, an encoded frame being represented as a set of non-overlapping areas of pixels used as units of coding, and the method being performed by a computer system and including selecting a current encoded block belonging to a current coding unit, determining a reference block in a reference frame, the reference block being used for generation of block-prediction for the current encoded block, and pixels of the reference block being already completely encoded and decoded, computing a correction parameter used to correct a change in illumination of the reference block, correcting the illumination, by adjusting values of all pixels of the reference block, based on the determined correction parameter, generating the block-prediction for the current encoded block, using the reference block with the corrected illumination, and decoding the current encoded block, through the generated block-prediction, wherein a procedure including the computing of the correction parameter and the correcting of the illumination includes obtaining values of pixels restored by encoding and then decoding, from a vicinity of the current encoded block of the encoded frame, and from a vicinity of the reference block, excluding from consideration a pixel included in the vicinity of the current encoded block and a pixel included in the vicinity of the reference block, the pixels being estimated to be unreliable for computation of the correction parameter used to correct the change in the illumination by at least one preset criterion, computing the correction parameter, based on an initial value and using only a reliable pixel, and estimating a change in values of pixels of the reference block, wherein, when the change is estimated to be essential, the values of the pixels of the reference block are corrected using the computed correction parameter.

The selecting of the current encoded block may include determining a size of the current encoded block, a relative allocation of the vicinity of the current encoded block and the vicinity of the reference block, and a size of each of the vicinity of the current encoded block and the vicinity of the reference block. Pixels of the current encoded block may be used to compute the correction parameter based on a decoding parameter of the current coding unit.

The size of the current encoded block, the relative allocation of the vicinity of the current encoded block and the vicinity of the reference block, and the size of each of the vicinity of the current encoded block and the vicinity of the reference block may be determined based on a type of applied decorrelated conversion. The pixels of the reference block may be used to compute the correction parameter based on the decoding parameter of the current coding unit.

The size of the current encoded block may be determined based on a preset division of the current coding unit into subblocks having separate motion vectors.

The size of the current encoded block may be less than a size of each of the subblocks that belong to the current coding unit and have separate motion vectors.

The size of the current encoded block may be obviously determined and encoded in a stream during the selecting of the current encoded block.

The determining of the reference block may include selecting a single reference frame from among all reference frames, the selected reference frame being used to search for the reference block, by a predetermined rule, and information on the selected reference frame not being encoded.

The selecting of the single reference frame may include selecting a synthesized frame for a current foreshortening with the same time tag as the encoded frame.

The selecting of the single reference frame may include selecting a reference frame belonging to one of adjacent foreshortenings, and having the same time tag as the encoded frame.

The determining of the reference block may include detecting a motion vector based on a similarity function that additionally considers mismatches in average levels of illumination of the current encoded block and a candidate for the reference block.

The similarity function may be computed by diving each of the current encoded block and the reference block into subblocks, wherein a size of each of the subblocks does not exceed the size of the current encoded block and the size of the reference block, by computing an average level of illumination for each of the subblocks, by adjusting each of the subblocks through subtraction of an average level of corresponding illumination from each of pixels in each of the subblocks, by computing a sum of absolute differences between the corrected reference block and the corrected encoded block, by computing a sum of absolute differences for average levels of all the subblocks, and by computing a similarity matrix as a sum of absolute differences of average levels of the subblocks, multiplied by a first nonnegative number, added to a sum of absolute differences of corrected blocks, multiplied by a second nonnegative number.

The reference block may be detected using a displacement vector (DV). A largest possible distance between the DV and a prediction of the DV may be limited so that a difference between horizontal components of the DV and the prediction of the DV, named as a horizontal projection, and a difference between vertical components of the DV and the prediction of the DV, named as a vertical projection of displacement, may have various limitations.

A limitation of the vertical projection may not exceed a limitation of a horizontal projection during determining of limitations for the horizontal projection and the vertical projection.

The encoding of the current encoded block may include encoding an additional syntactic element for the current coding unit, to which the current encoded block belongs, and determining, based on a value of the additional syntactic element, whether a change in a value of a pixel of a reference block of the current coding unit is essential or unessential.

The encoding of the current encoded block may include encoding a single additional syntactic element for each subblock of the current coding unit, the single additional syntactic element having a unique index of a reference frame in the current coding unit, and determining, based on a value of the additional syntactic element, whether the change in the values of the pixels of the reference block is essential or unessential.

The encoding of the current encoded block may include encoding an additional syntactic element. The encoded additional syntactic element may have a value in detecting of the reference block using a prediction of a motion vector that is adapted for a method of correcting the values of the pixels of the reference block and computing a correction parameter used to correct a change in illumination, and the correcting of the values of the pixels of the reference block that are performed, and a value in detecting of the reference block using a standard prediction of a motion vector that is adapted for a method of computing a correction parameter used to correct a change in illumination, and the correcting of the values of the pixels of the reference block that are not performed.

The motion vector adapted for the correcting of the values of the pixels of the reference block may be predicted only in a reference frame of an adjacent view.

The motion vector may be predicted using a founded motion vector pointing to a reference frame of an adjacent view, and using an already encoded depth map.

The correction parameter may not be encoded during the encoding of the current encoded block.

An additional correction parameter may be computed based on the values of the pixels of the reference block and values of the pixels of the current encoded block, and may be used to correct the values of the pixels of the reference block. The encoding of the current encoded block may include encoding the additional correction parameter using the correction parameter, and computing the additional correction parameter based on the obtained values of the restored pixels.

The foregoing and/or other aspects are achieved by providing a method of decoding a multiview video sequence based on adaptive compensation of a local illumination mismatch in inter-frame prediction, a decoded frame being represented as a set of non-overlapping areas of pixels used as units of coding, and the method being performed by a computer system and including selecting a current decoded block belonging to a current coding unit, determining a reference block for the current decoded block, the reference block being included in a reference frame, computing a correction parameter used to correct a change in illumination of the determined reference block, correcting the illumination, by adjusting values of all pixels of the reference block, based on the determined correction parameter, generating a block-prediction for the current decoded block, using the reference block with the corrected illumination, and decoding the current decoded block through the generated block-prediction, wherein a procedure including the computing of the correction parameter and the correcting of the illumination includes obtaining values of pixels restored by encoding and then decoding, from a vicinity of the current decoded block of the decoded frame, and from a vicinity of the reference block, excluding from consideration a pixel included in the vicinity of the current decoded block and a pixel included in the vicinity of the reference block, the pixels being estimated to be unreliable for computation of the correction parameter used to correct the change in the illumination by at least one preset criterion, computing the correction parameter, based on found numerical ratios considering an initial value, and correcting values of pixels of the reference block, using the computed correction parameter, when a change in the values of the pixels of the reference block is estimated to be essential.

The selecting of the current decoded block may include determining a size of the current decoded block, a relative allocation of the vicinity of the current decoded block and the vicinity of the reference block, and a size of each of the vicinity of the current decoded block and the vicinity of the reference block. Pixels of the current decoded block may be used to compute the correction parameter based on a decoding parameter of the current coding unit.

The size of the current decoded block, the relative allocation of the vicinity of the current decoded block and the vicinity of the reference block, and the size of each of the vicinity of the current decoded block and the vicinity of the reference block may be determined based on a type of applied decorrelated conversion. The pixels of the reference block may be used to compute the correction parameter.

The size of the current decoded block may be detected based on a preset division of the current coding unit into subblocks having separate motion vectors.

The size of the current decoded block may be less than a size of each of the subblocks that belong to the current coding unit and have separate motion vectors.

The selecting of the current decoded block may include determining the size of the current decoded block based on decoded information in an input bitstream.

The determining of the reference block may include selecting a single reference frame from among all reference frames, the selected reference frame being used to search for the reference block, by a predetermined rule, and information on the selected reference frame not being included in the input bitstream.

The selecting of the single reference frame may include selecting a synthesized frame for a current foreshortening with the same time tag as the decoded frame.

The selecting of the single reference frame may include selecting a reference frame belonging to one of adjacent foreshortenings, and having the same time tag as the decoded frame.

The decoding of the current decoded block may include decoding an additional syntactic element for the current coding unit, to which the current decoded block belongs, and defining, based on a value of the additional syntactic element, whether a change in a value of a pixel of a reference block of the current coding unit is essential or unessential.

The decoding of the current decoded block may include decoding a single additional syntactic element for each subblock of the current coding unit, the single additional syntactic element having a unique index of a reference frame in the current coding unit, and defining, based on a value of the additional syntactic element, whether the change in the values of the pixels of the reference block is essential or unessential.

The decoding of the current decoded block may include may include decoding an additional syntactic element. The decoded additional syntactic element may accept at least two values, that is, a value in detecting of the reference block using a prediction of a motion vector that is adapted for a method of correcting the values of the pixels of the reference block and computing a correction parameter used to correct a change in illumination, and the correcting of the values of the pixels of the reference block that are performed, and a value in detecting of the reference block using a standard prediction of a motion vector that is adapted for a method of computing a correction parameter used to correct a change in illumination, and the correcting of the values of the pixels of the reference block that are not performed.

The motion vector adapted for the correcting of the values of the pixels of the reference block may be predicted only in a reference frame of an adjacent view.

The motion vector may be predicted using a founded motion vector pointing to a reference frame of an adjacent view, and using an already encoded depth map.

During the decoding of the current decoded block, information on the correction parameter may not be included in the input bitstream.

The decoding of the current decoded block may include decoding an additional correction parameter used to correct the change in the illumination, with usage of the correction parameter, the additional correction parameter being placed in an input bitstream, and being computed based on the obtained values of pixels.

The foregoing and/or other aspects are achieved by providing a method of decoding a multiview video sequence based on adaptive compensation of a local illumination mismatch in inter-frame prediction, a decoded frame being represented as a set of non-overlapping areas of pixels used as units of coding, and the method being performed by a computer system and including selecting a current decoded block belonging to a current coding unit, determining a reference block for the current decoded block, the reference block being included in a reference frame, computing a correction parameter used to correct a change in illumination of the determined reference block, correcting the illumination, by adjusting values of all pixels of the reference block, based on the determined correction parameter, generating a block-prediction for the current decoded block, using the reference block with the corrected illumination, and decoding the current decoded block through the generated block-prediction, wherein a procedure including the computing of the correction parameter and the correcting of the illumination includes obtaining values of pixels restored by encoding and then decoding, from a vicinity of the current decoded block of the decoded frame, and from a vicinity of the reference block, excluding from consideration a pixel included in the vicinity of the current decoded block and a pixel included in the vicinity of the reference block, the pixels being estimated to be unreliable for computation of the correction parameter used to correct the change in the illumination by at least one preset criterion, determining a numerical ratio between pixels of the reference block, a numerical ratio between reliable pixels located in the vicinity of the current decoded block, and a numerical ratio between reliable pixels located in the vicinity of the reference block, computing the correction parameter, based on the determined numerical ratios considering an initial value, and correcting values of the pixels of the reference block, using the computed correction parameter, when a change in the values of the pixels of the reference block is estimated to be essential.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
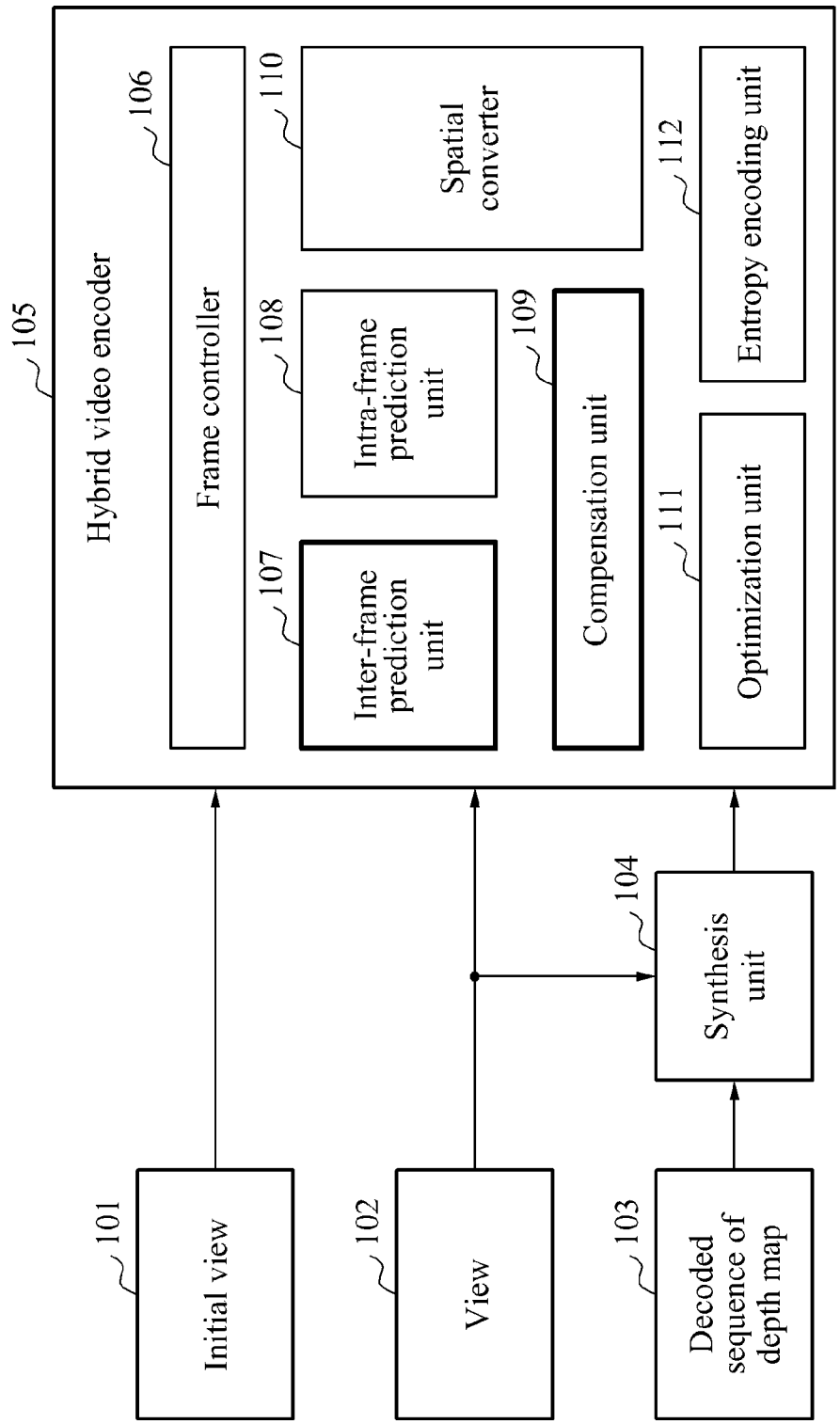
FIG. 1 illustrates a block diagram of a hybrid video encoder for a multiview video sequence according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1 illustrates a block diagram of a hybrid video encoder 105 for a multiview video sequence according to example embodiments.

In FIG. 1, input data of the hybrid video encoder 105 may include an initial view 101 (that is, an encoded foreshortening), and a view 102 (that is, a foreshortening) that is already encoded and then decoded. The view 102, and a decoded sequence 103 of a depth map may be used to generate a synthesized view for the initial view 101 by a synthesis unit 104. Additionally, the synthesized view may be input to the hybrid video encoder 105.

The hybrid video encoder 105 may include function units used to encode the initial view 101. The function units may include, for example, a frame controller 106, an inter-frame prediction unit 107, an intra-frame prediction unit 108, a compensation unit 109, a spatial converter 110, an optimization unit 111, and an entropy encoding unit 112. The frame controller 106 may control reference frames, the inter-frame prediction unit 107 may perform inter-frame prediction, and the intra-frame prediction unit 108 may perform intra-frame prediction. The compensation unit 109 may perform inter-frame and intra-frame compensation, and the spatial converter 110 may perform spatial conversion. The optimization unit 111 may optimize a ratio of a speed and distortion, and the entropy encoding unit 112 may perform entropy encoding. The function units have been further described in "Richardson I. E. The H.264 Advanced Video Compression Standard. Second Edition. 2010." A method according to example embodiments may be performed in the inter-frame prediction unit 107.

Figure 2:
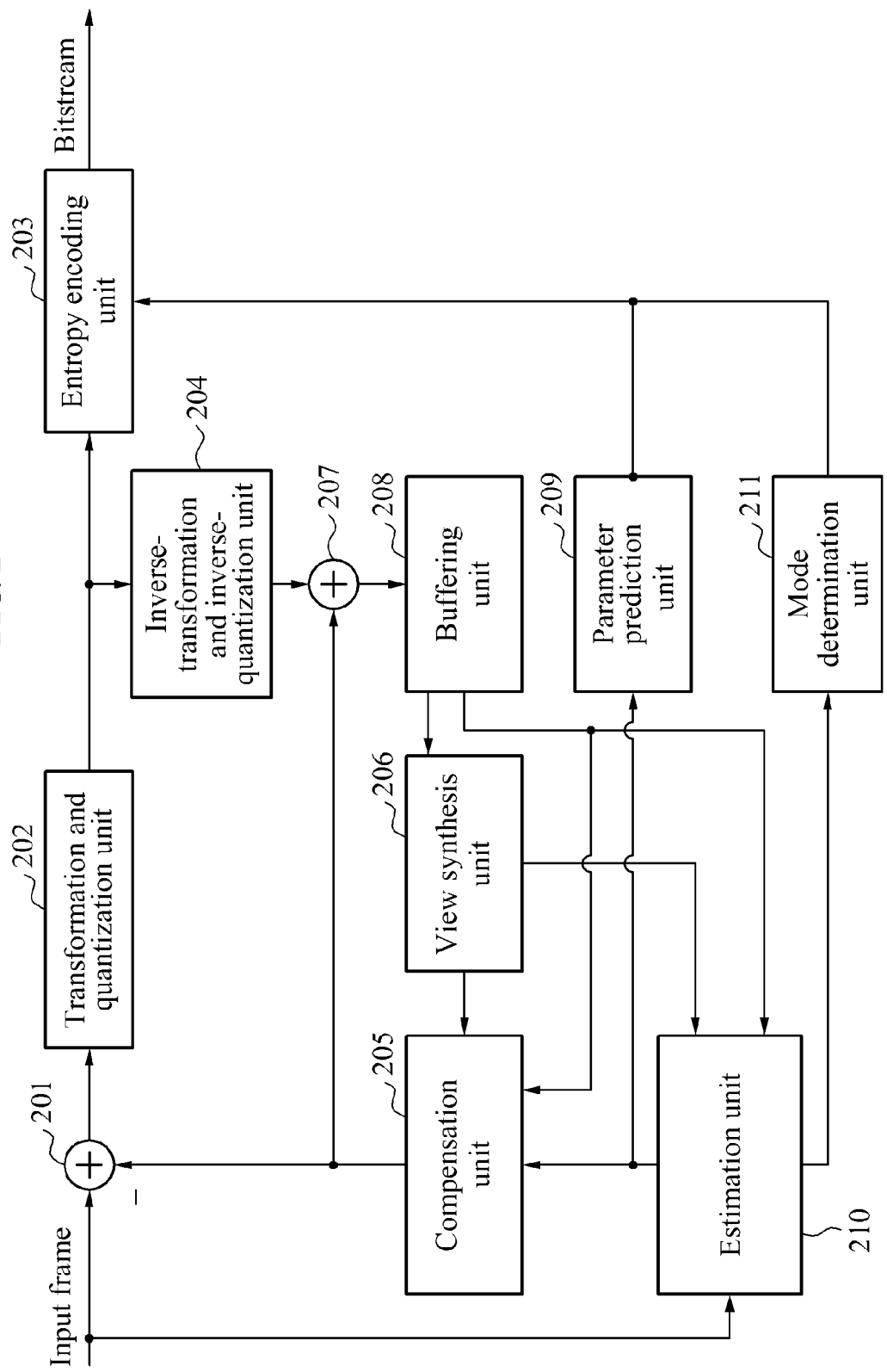
FIG. 2 illustrates a diagram of a part of components of a hybrid video encoder for performing prediction that is a part of an encoding process according to example embodiments.

FIG. 2 illustrates a diagram of a part of components of a hybrid video encoder for performing prediction that is a part of an encoding process according to example embodiments.

In FIG. 2, the hybrid video encoder may include, for example, a diminution unit 201, a transformation and quantization unit 202, an entropy encoding unit 203, an inverse-transformation and inverse-quantization unit 204, a compensation unit 205, a view synthesis unit 206, a composition unit 207, a buffering unit 208, a parameter prediction unit 209, an estimation unit 210, and a mode determination unit 211.

The transformation and quantization unit 202 may perform transformation and quantization, and the inverse-transformation and inverse-quantization unit 204 may perform inverse-transformation and inverse-quantization. The compensation unit 205 may compensate for a displacement, and may correct a change in illumination and contrast. The view synthesis unit 206 may synthesize views, that is, foreshortenings. The buffering unit 208 may store reference frames and a depth map. The parameter prediction unit 209 may predict parameters used for compensation and correction. The estimation unit 210 may estimate a displacement, and a change in illumination and contrast. The mode determination unit 211 may determine an encoding mode of a macroblock. The diminution unit 201, the transformation and quantization unit 202, the entropy encoding unit 203, the inverse-transformation and inverse-quantization unit 204, the composition unit 207, the buffering unit 208, the parameter prediction unit 209, and the mode determination unit 211 may be used to perform basic hybrid encoding. Additionally, the view synthesis unit 206 may be characterized in a hybrid encoding system, because the view synthesis unit 206 may generate additional frames through synthesis from decoded frames and depth maps.

The method according to example embodiments may be performed by the compensation unit 205, and the estimation unit 210. The compensation unit 205, and the estimation unit 210 may perform a block encoding method including a prediction operation which will be described below.

The hybrid video encoder may search for a reference block for a current block of a current encoded frame. For example, the hybrid video encoder may optimize between bit expenses used to encode a displacement vector (DV), and a value of spacing between the current encoded block and a corrected reference block, and may search for the reference block for the current block. The DV may be set by a plurality of pairs of numbers (i, j). The corrected reference block may be expressed as shown in Equation 1 below.

$$\sum_{m=1}^{H}\sum_{n=1}^{W} |(I(m, n) - \Psi(R(m + i, n + j))|^P \quad \text{[Equation 1]}$$

In Equation 1, I(m,n) denotes a value of illumination of a pixel with coordinates (m, n) in the current block. The current block may have a size of "H×W." i, and j may be used to determine a DV indicating a reference block R within a predetermined search area. $\Psi(x)$ denotes a function used to correct possible mismatches of illumination and contrast between the current block and the reference block. Additionally, P may have a value greater than zero, for example, P may typically have a value of "1" or "2." The method according to example embodiments may be performed by the estimation unit 210. Correction parameters used to correct a change in illumination, together with an obtained DV, may be transmitted to the compensation unit 205, and the parameter prediction unit 209. For example, in practical implementation, when a criterion to be set for a super-block including several blocks considered at once is minimized, a DV may be determined based on a plurality of blocks considered to more simply represent service information. The criterion may be expressed as shown in Equation 2 below.

$$\sum_{m=1}^{H1}\sum_{n=1}^{W1} |(I(m, n) - \Psi(R(m + i, n + j))|^P \quad \text{[Equation 2]}$$

In Equation 2, H1, and W1 denote, respectively, a height, and a weight of the super-block.

The compensation unit 205 may transform the found reference block in correspondence with determining of a correction parameter used to correct a change in illumination. The diminution unit 201 may obtain a difference by subtracting a value received from the compensation unit 205 from an input frame value. The difference may be transformed by digital cosine transformation (DCT) and quantized by the transformation and quantization unit 202, and may be encoded by the entropy encoding unit 203. Additional data SI may be required for a next decoding process, and may also be encoded by the entropy encoding unit 203.

Figure 3:
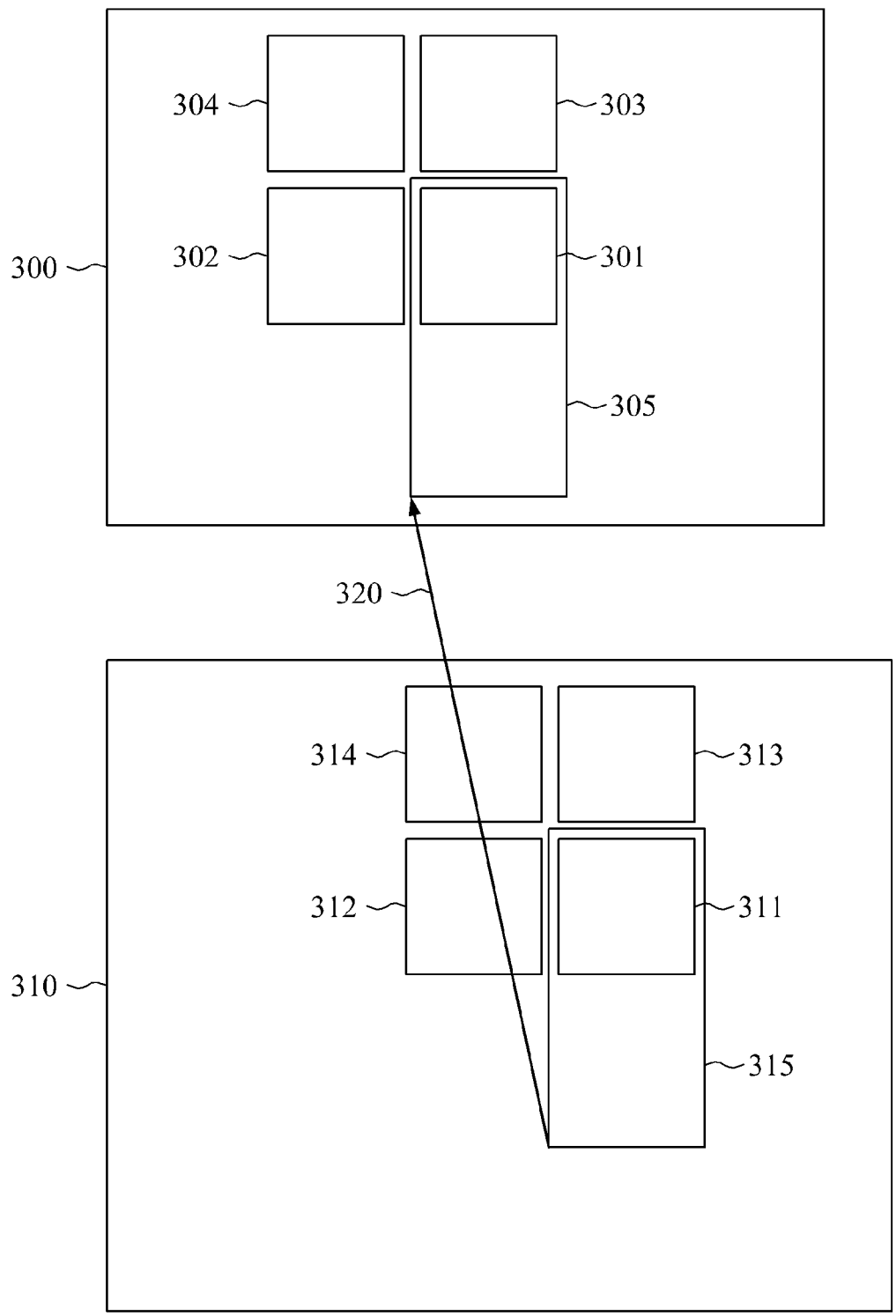
FIG. 3 illustrates a diagram of main elements of an encoded reference frame used to compute correction of a change in illumination of a reference block according to example embodiments.

FIG. 3 illustrates a diagram of main elements of an encoded reference frame used to compute correction of a change in illumination of a reference block according to example embodiments.

In FIG. 3, a DV 320 may be defined for a current block 311 of a current encoded frame 310. The DV 320 may also be defined for an encoded super-block 315. The current block 311 may be a part of the encoded super-block 315. In addition, the DV 320 may be defined for the encoded super-block 315. The DV 320 may enable a reference block 301 to be unambiguously defined from a reference frame 300 for the current block 311. The DV 320 may unambiguously set a reference super-block 305 corresponding to the encoded super-block 315. The reference frame 300, the reference block 301, the reference super-block 305, blocks 302, 303 and 304, and restored blocks 312, 313 and 314 in the current encoded frame 310 may be used in both encoding and decoding.

Figure 4:
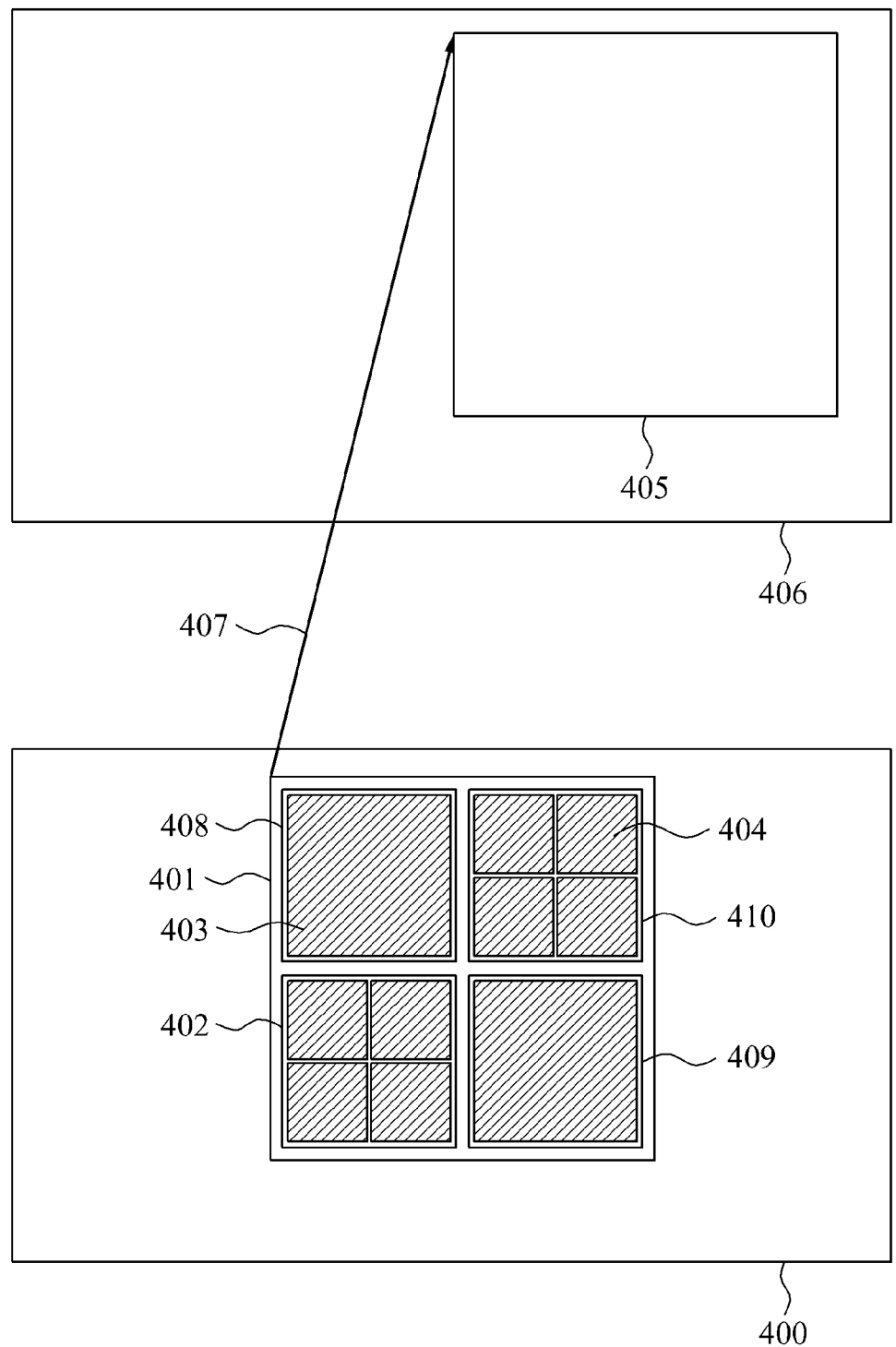
FIG. 4 illustrates a diagram of an example of a super-block, one of possible combinations of blocks with various sizes in the super-block, and two types of spatial conversion used for decorrelation of difference data according to example embodiments.

FIG. 4 illustrates a diagram of an example of a super-block, one of possible combinations of blocks with various sizes in the super-block, and two types of spatial conversion used for decorrelation of difference data according to example embodiments.

Referring to FIG. 4, an encoded frame 400 may include a super-block 401 that includes at least one current encoded block, and a DV 407. The DV 407 may enable a reference super-block 405 in a reference frame 406 to be unambiguously defined, and may be set for the super-block 401. The super-block 401 may include blocks 402, 403, 404, and 409. Both the blocks 402 and 404 may be encoded by conversion with a smaller size than the conversion applied to the blocks 403 and 409. Selecting a size of a super-block, a type and a conversion size may be defined by an encoder based on preset criteria used to minimize a cost of data encoding for a given site of an encoded frame. As shown in FIG. 4, the blocks 402, 403, 404, and 409 may be logically connected to each other, because the blocks 402, 403, 404, and 409 are included in the super-block 401.

Figure 5A:
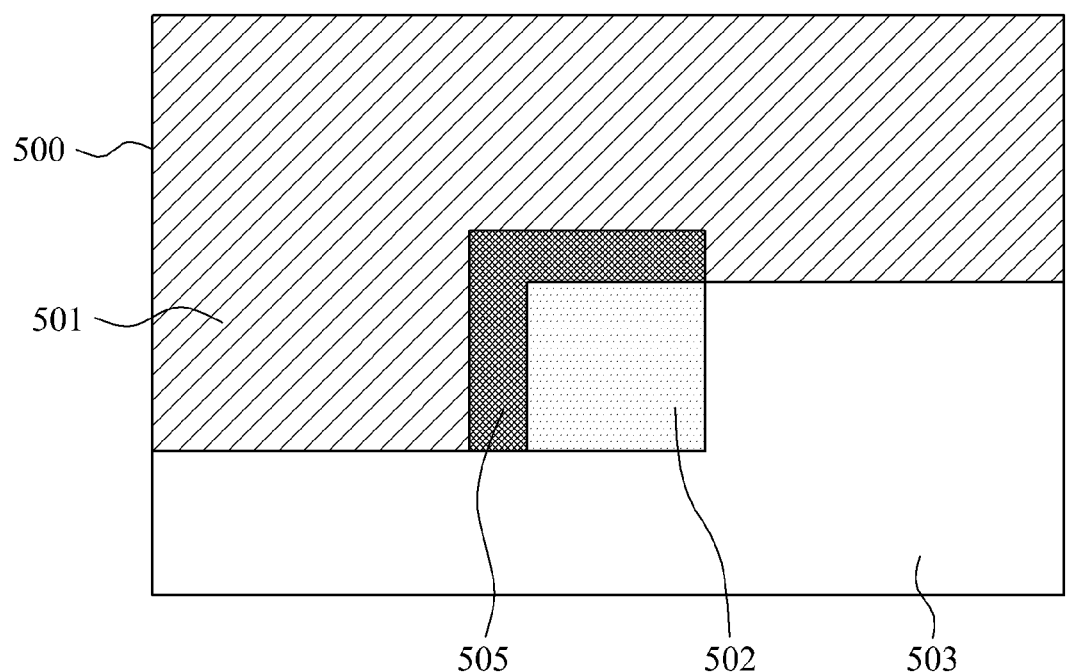
FIGS. 5A and 5B illustrate diagrams of a proximity concept, and a process of selecting input data from a current frame during computing of a correction parameter used to correct a change in illumination according to example embodiments.
Figure 5B:
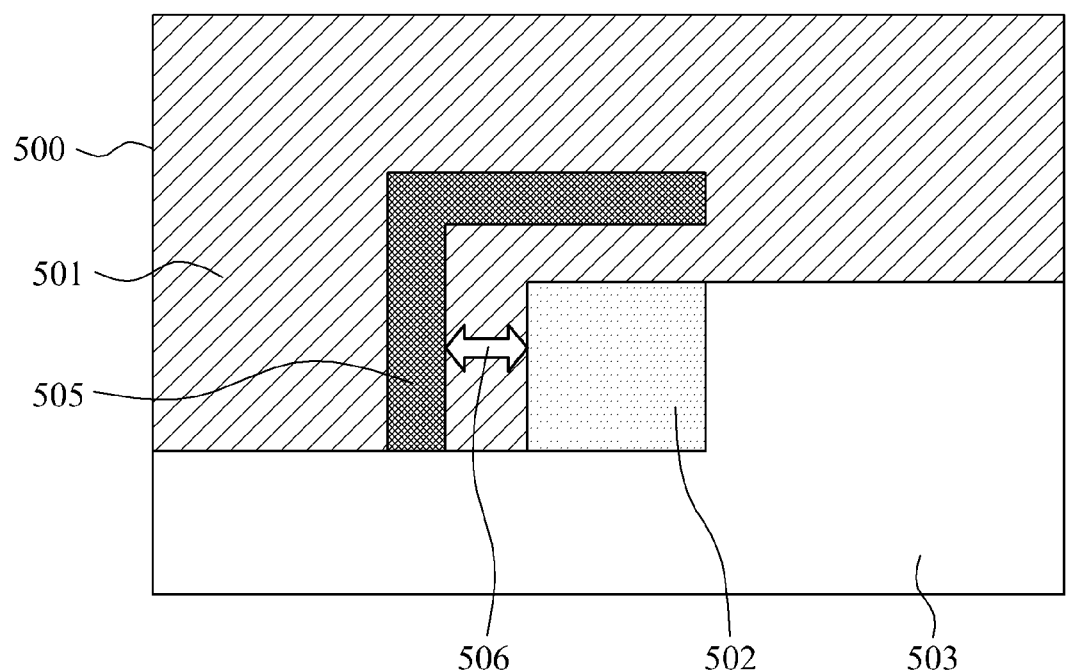

FIGS. 5A and 5B illustrate diagrams of a proximity concept, and a process of selecting input data from a current frame during computing of a correction parameter used to correct a change in illumination according to example embodiments. Additionally, FIGS. 5A and 5B illustrate relative positioning in a main area of a current frame 500.

An area 501 of the current frame 500 may be used during encoding and decoding of a current encoded block 502. The area 501 may be called a "template." An area 503 may not be used during decoding of the current encoded block 502. A correction parameter used to correct a change in illumination of a reference block may be computed based on pixels of the current frame placed only in area 501. To correct the change in the illumination of the reference block in an encoder and decoder, the correction parameter may not need to be transmitted from an encoder to a decoder via an output bitstream. Some pixels in the area 501 may be used to compute the correction parameter, and may be expressed by an area 505.

Pixels used to compute the correction parameter may be selected from at least one spatial area. Each of the at least one spatial area may have a characteristic such as a preset proximity that is associated with a current block of a current encoded frame and a current reference block of a reference frame. Referring to FIG. 5B, the area 505 may be selected as a spatial area, and a proximity may be determined by a shortest distance 506 among distances between areas and block edges.

Area 505 may be selected by a type of spatial conversion applied after encoding of a difference between pixel information and already decoded pixels, by sizes of blocks that are already encoded and located adjacent to the current block, and by logical links between the current encoded block and adjacent blocks that are set by an encoding algorithm.

Additionally, an estimate of similarity of pixels that are located adjacent to the current encoded block and considered to be connected to each other, and pixels that are located adjacent to the reference block and considered to be connected to each other may be additionally computed. The computed estimate of the similarity may be used as an additional condition to determine usage of correction of illumination of pixels in the reference block.

According to example embodiments, pixel correction of an illumination change for the reference block may be provided in encoding with prediction. A key idea may be pixel estimation of a correction parameter used to correct a change in illumination. The correction may be based on restored values of pixels located adjacent to the current block, values of pixels in the reference frame, and similarity between the pixels. The above technology may be illustrated in FIG. 6.

Figure 6:
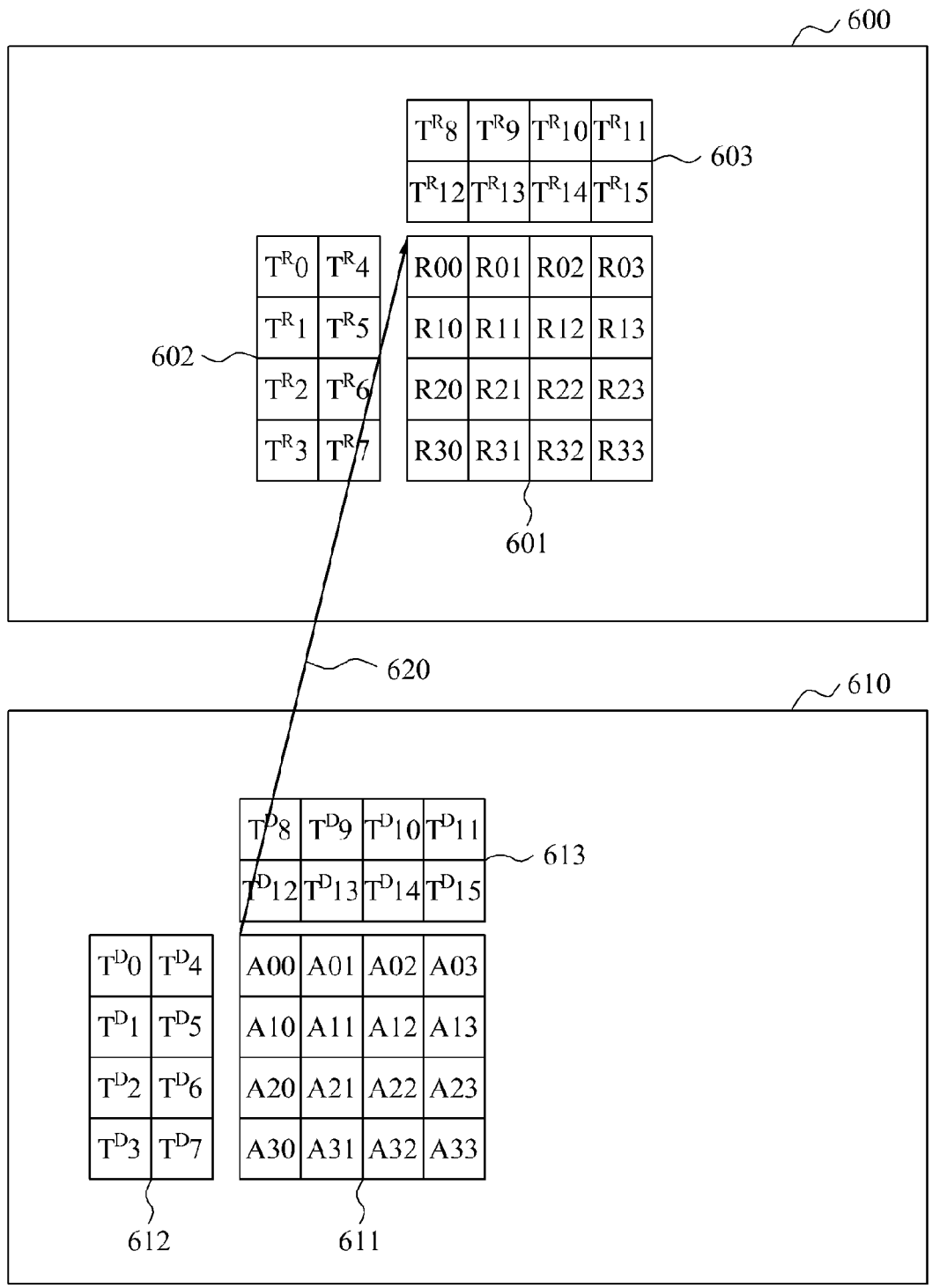
FIG. 6 illustrates a diagram of correction of a change in illumination for a reference block based on one of variables according to example embodiments.

FIG. 6 is a diagram illustrating correction of a change in illumination for a reference block based on one of a plurality of variables according to example embodiments.

Referring to FIG. 6, a DV 620 may be determined for a current block 611 included in a current encoded frame 610. The DV 620 may point to a reference block 601 included in a reference frame 600. The current block 611 may include "4×4" pixels designated as A00 to A33. The reference block 601 may include pixels designated as R00 to R33. Restored values of pixels located adjacent to the current block 611 may be designated as $T^P0$ to $T^P15$. Blocks 612 and 613 may have "4×2" pixels, and "2×4" pixels for definiteness. Values of pixels included in blocks 602 and 603 may be designated as $T^R0$ to $T^R15$. The blocks 602 and 603 may be located adjacent to the reference block 601, and may correspond to the blocks 612 and 613.

A change in illumination may be corrected for each of positions (i, j) of the pixels in the reference block 601, based on Equation 3 below.

$$\Psi(x_{i,j}) = \alpha_{i,j} \cdot x_{i,j}. \qquad \text{[Equation 3]}$$

In Equation 3, $\alpha_{i,j}$ denotes a correction parameter used to correct a change in illumination for each pixel, when $estR_{i,j}$ is not equal to zero, and may be expressed as shown in Equation 4 below.

$$\alpha_{i,j} = \frac{estD_{i,j}}{estR_{i,j}}, \qquad \text{[Equation 4]}$$

In Equation 4, $estD_{i,j}$ denotes a first estimate for a pixel with coordinates (i, j) in a current block, and $estR_{i,j}$ denotes a second estimate for a pixel with coordinates (i, j) in a reference block. When the second estimate $estR_{i,j}$ is equal to zero, $\alpha_{i,j}$ may be assumed to be "1."

Figure 7:
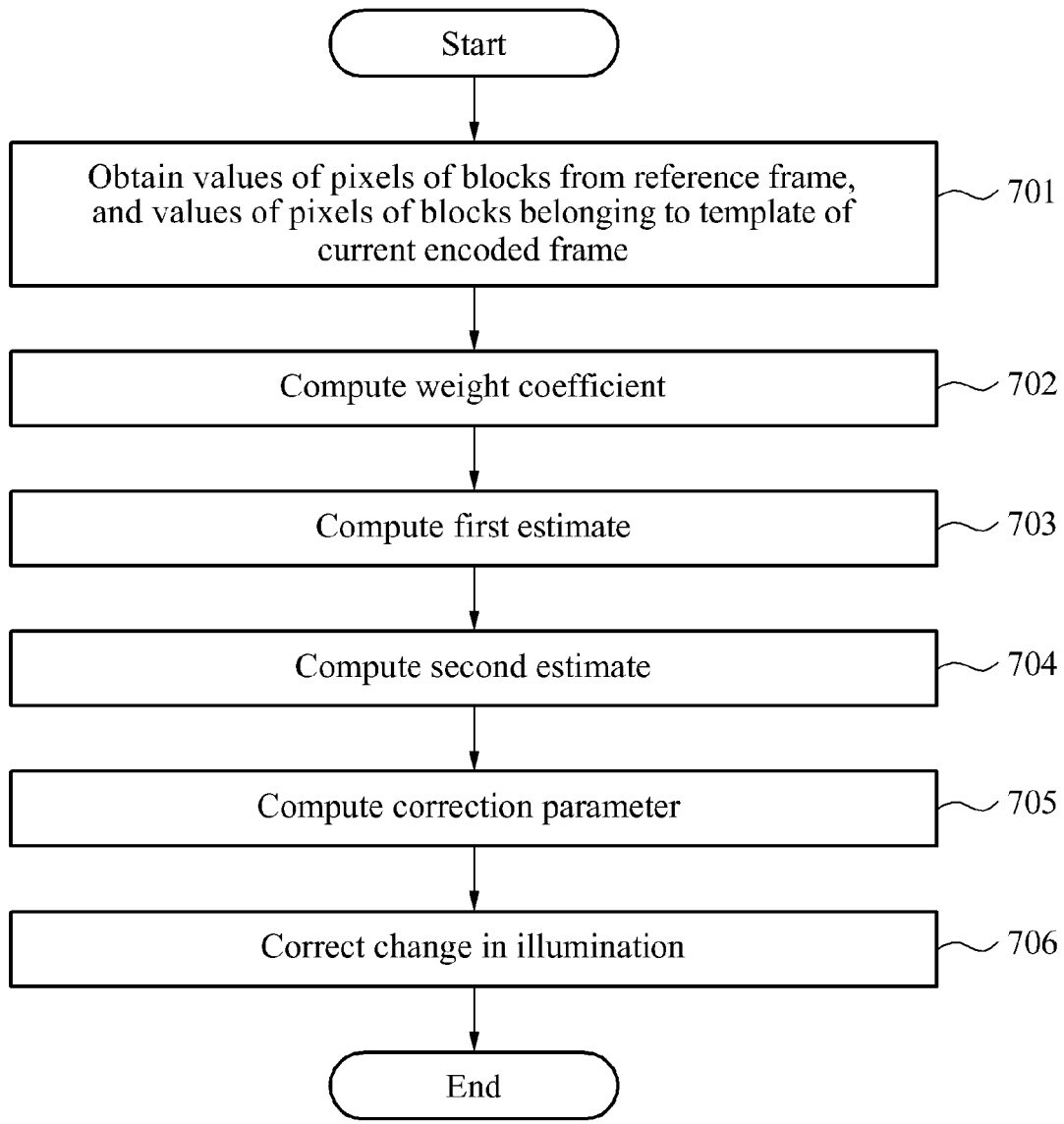
FIG. 7 illustrates a flowchart of a method of correcting a change in illumination for each pixel in a reference block according to example embodiments.

FIG. 7 illustrates a flowchart of a method of correcting a change in illumination for each pixel in a reference block according to example embodiments. The method of FIG. 7 may include operations that will be described below.

Referring to FIGS. 6 and 7, in 701, values of pixels in the reference block 601 and the blocks 602 and 603 may be obtained from the reference frame 600, and values of pixels in the current block 611 and the blocks 612 and 613, belonging to a template of the current encoded frame 610 may be obtained. Estimation of similarity between pixels of the blocks 602 and 603 and pixels of the blocks 612 and 613 will be described below.

All pixels that are already restored and located adjacent to a reference block, for example some pixels of the blocks 602 and 603, and all pixels that are already restored and located adjacent to a current encoded block, for example some pixels of the blocks 612 and 613, may be formed in "M" non-overlapping groups G0 to GM−1, for example, $(T_k^R, T_k^D)$, k=0 ... N−1 $\Sigma\{G_0 \cap G_1 \cap \ldots \cap G_{M-1}\}$. All the pixels located adjacent to the reference block may have values $T_k^R$, all the pixels located adjacent to the current encoded block may have values $T^D_k$, and k may have a value of "0" to "N−1." All the pixels with the values $T^R_k$, and all the pixies with the values $T^D_k$ may form joint pairs that are unambiguously set by spatial positions of the pixels with the values $T^R_k$, and the pixies with the values $T^D_k$ in corresponding areas. The corresponding areas may be determined by a number of pixels k. A group may be a block of pairs of pixels. The block of the pairs of pixels may have, for example, a size of "2×2" pairs of pixies, or "4×4" pairs of pixies, based on an actual size of each of the blocks 602, 603, 612, and 613. Additionally, pairs of pixels belonging to a group Gi may be designated as "$\{(T^R_{ki}, T^D_{ki}) \in Gi\}$."

For each group Gi, a matrix MR_Norm(G) may be computed by Equation 5 below. The matrix MR_Norm($G_i$) may be computed, based on registration of pixel distinctions $T^R_{ki}$ and $T^D_{ki}$, except a distinction between an average value of all pixels $T^R_{ki}$ and an average value of all pixels $T^D_{ki}$ of each group Gi, $$MR\_Norm(G_i) = \sum_{(T^R_{ki}, T^D_{ki}) \in Gi} \left( \left| T^R_{ki} - T^D_{ki} - \frac{\sum_{(T^R_{ki}, T^D_{ki}) \in Gi} T^R_{ki}}{|Gi|} + \frac{\sum_{(T^R_{ki}, T^D_{ki}) \in Gi} T^D_{ki}}{|Gi|} \right|^{P1} \right) \quad \text{[Equation 5]}$$

In Equation 5, a value of a degree factor P1 may be experimentally determined, and may be set to "1" for definiteness.

For each group Gi, a matrix M_Norm(G) may be computed based on the distinction between the average value of all pixels $T^R_{ki}$ and average value of all pixels $T^D_{ki}$ of each group Gi, as shown in Equation 6 below.

$$M\_Norm(G_i) = \sum_{(T^R_{ki}, T^D_{ki}) \in Gi} \left( \left| \frac{\sum_{(T^R_{ki}, T^D_{ki}) \in Gi} T^R_{ki}}{|Gi|} - \frac{\sum_{(T^R_{ki}, T^D_{ki}) \in Gi} T^D_{ki}}{|Gi|} \right|^{P2} \right) \quad \text{[Equation 6]}$$

In Equation 6, a value of a degree factor P2 may be experimentally determined, and may be set to "1" for definiteness.

A common matrix may be computed based on registration of pixel distinctions $T^R_{ki}$ and $T^D_{ki}$, by each of groups, except the distinction between the average value of all the pixels $T^R_{ki}$ and the average value of all the pixels $T^D_{ki}$ of each group Gi, as shown in Equation 7 below. The common matrix may be designated as MR_Norm, for the groups G0 to GM−1.

$$MR\_Norm = \sum_{i=0 \ldots M-1} MR\_Norm(G_i) \quad \text{[Equation 7]}$$

The common matrix may be computed based on registration of distinctions of average values of all pixels $T^R_{ki}$ and average values of all pixels $T^D_{ki}$ of each group Gi, as shown in Equation 8 below. The common matrix may be designated as M_Norm, for the groups G0 to GM−1.

$$M\_Norm = \sum_{i=0 \ldots M-1} M\_Norm(G_i) \quad \text{[Equation 8]}$$

Values of the computed matrices MR_Norm and M_Norm may be compared with preset thresholds. For example, when the matrix MR_Norm is greater than a first set threshold, or when the matrix M_Norm is less than a second set threshold, a similarity between the pixels adjacent to the reference block and the pixels adjacent to the current encoded block may be determined to be weak. Otherwise, the similarity may be determined to be strong.

When the similarity is determined to be weak, correction of a change in illumination may not be applied.

When the similarity is determined to be strong, the change in illumination may be corrected unconditionally.

In 702, a weight coefficient $W_k(i,j)$ may be computed for each of positions (i, j) of pixels in the reference block 601. The weight coefficient $W_k(i,j)$ may be expressed as shown in Equation 9, and k may have a value of "0" to "N−1."

$$W_k(i, j) = \exp(-C1 \cdot A_k(i, j)^{C2} + C3) \quad \text{[Equation 9]}$$
$$A_k(i, j) = |R_{i,j} - T^R_k|$$

In Equation 9, C1, C2, and C3 may be experimentally defined, and may denote numerical parameters that set non-linear dependence of a weight coefficient from a value $A_k(i, j)$. N may denote a total number of pixels in the blocks 612 and 613, or a total number of pixels in the blocks 602 and 603. The weight coefficient $W_k(i,j)$ may indicate that the closer the value $R_{ij}$ to $T^R_k$, the higher contribution on determination of a correction parameter used to correct a change in illumination.

In 703, a first estimate $estD_{i,j}$ for each of positions (i, j) of pixels in the current block 611 may be computed as shown in Equation 10 below.

$$estD_{i,j} = BaseD + \sum_{\substack{k=0 \ldots N-1 \\ k: |T^R_k - T^D_k| \leq Thr1 \text{ and } |T^R_k - R_{ij}| \leq Thr2}} W_k(i, j) \times L_k(i, j) \times T^D_k \quad \text{[Equation 10]}$$

In Equation 10, Thr1 and Thr2 denote predetermined thresholds, and BaseD denotes an initial value of a first estimate. A threshold may be used to exclude values of pixels adjacent to the reference block. The threshold may essentially differ from values $R_{i,j}$ and $T^D_k$ of pixels adjacent to the current encoded block. Additionally, $L_k(i,j)$ may denote a second set of weight coefficients.

In 704, a second estimate $estR_{i,j}$ for each of positions (i, j) of the pixels in the reference block 601 may be computed as shown in Equation 11 below.

$$estR_{i,j} = BaseR + \sum_{\substack{k=0 \ldots N-1 \\ k: |T^R_k - T^D_k| \leq Thr1 \text{ and } |T^R_k - R_{ij}| \leq Thr2}} W_k(i, j) \times L_k(i, j) \times T^R_k \quad \text{[Equation 11]}$$

Predetermined thresholds Thr1 and Thr2 may be computed in the same manner as in computation of the first estimate $estD_{i,j}$. BaseR may denote an initial value of a second estimate.

To increase accuracy of a correction parameter $\alpha_{i,j}$ used to correct a change in illumination, the obtained pixels $T^R_k$ and $T^D_k$ may be excluded from consideration. The obtained pixels $T^R_k$ and $T^D_k$ may belong to an already decoded and restored area of each of the reference frame and the current encoded frame, and may differ from a common sample, for example a common set, of pixels in a predetermined area.

The pixels $T^D_k$ may be grouped so that all the pixels $T^R_k$ may satisfy conditions "$T^R_k > LR_i$" and "$T^R_k < LR_{i+1}$." The pixels $T^D_k$ may correspond to the pixels $T^R_k$, based on a serial number k, and a spatial position in the reference frame and the encoded frame, and may be formed in a group designated as "$B(LR_i, LR_{i+1})$."

$$B(LR_i, LR_{i+1}) = \left\{ T^D_k \underset{k=0...N-1}{:} T^R_k > LR_i \bigwedge T^R_k < LR_{i+1} \right\} \quad \text{[Equation 12]}$$

In Equation 12, values $LR_i$, and $LR_{i+1}$ may be used to determine band limits that set the group $B(LR_i, LR_{i+1})$, and may satisfy conditions "$L_R > -1$" and "$LR_{i+1} > R_i$". A number $N_B$ of groups $B(LR_i, LR_{i+1})$ may be experimentally determined, and may be used to set a largest possible value of an index i used at indexing of values ($LR_i$, $LR_{i+1}$): $-1 < LR_0 < LR_0 < LR_0 \ldots < LR_{NB}$.

Values of Equation 13 may be computed for each group $B(LR_i, LR_{i+1})$ set by values ($LR_i$, $LR_{i+1}$).

$$C\_Plus(LRi, LRi+1) = \quad \text{[Equation 13]}$$
$$\sum_{T^D_k \in B(LRi, LRi+1)} \begin{cases} 1, T^R_k \geq T^D_k + Thr5 \\ 0, T^R_k < T^D_k + Thr5 \end{cases}$$

$$C\_Minus(LRi, LRi+1) =$$
$$\sum_{T^D_k \in B(LRi, LRi+1)} \begin{cases} 1, T^R_k \leq T^D_k - Thr5 \\ 0, T^R_k > T^D_k - Thr5 \end{cases}$$

Correctness of the following three conditions may be checked for each pixel $T^D_k \in B(LRi, LRi+1)$ of the group $B(LR_i, LR_{i+1})$:

$|C\_Plus(LR_i, LR_{i+1}) - C\_Minus(LR_i, LR_{i+1})| < Thr6;$  Condition 1

$C\_Plus(LR_i, LR_{i+1}) - C\_Minus(LR_i, LR_{i+1}) >= Thr6$ AND
   $T^R_k \geq T^D_k + Thr5$; and  Condition 2

$C\_Plus(LR_i, LR_{i+1}) - C\_Minus(LRi, LRi+1) <= -Thr6$
   AND $T^R_k \leq T^D_k - Thr5$  Condition 3

When at least one of the checked conditions 1 to 3 is correct for a next considered pixel $T_k^D \in B(LRi, LRi+1)$ of the group $B(LR_i, LR_{i+1})$, the considered pixel $T_k^D \in B(LRi, LRi+1)$ may be included in further computations of correction parameters used to correct a change in illumination of the reference block.

When the second estimate $estR_{i,j}$ is not equal to zero, the correction parameter $\alpha_{i,j}$ may be computed for each of the pixels with coordinates (i, j) in the reference block 601, based on the first estimate $estD_{i,j}$ and the second estimate $estR_{i,j}$ in 705. When the second estimate $estR_{i,j}$ is equal to zero, the correction parameter $\alpha_{i,j}$ may be assumed to be "1."

For example, when the first estimate $estD_{i,j}$ and the second estimate $estR_{i,j}$ satisfy predetermined conditions and the correction parameter $\alpha_{i,j}$ is close to "1," expenses associated with compensation of the pixels of the reference block may be reduced. The predetermined conditions may include, for example, $\lfloor EstR_{i,j} + \Delta 1 \rfloor >> Qbits_1 == \lfloor EstD_{i,j} + \Delta 1 >> Qbits_1$, $EstD_{i,j} >> Qbits == EstR_{i,j} >> Qbits$, and $EstD_{i,j} >> Qbits == EstR_{i,j} >> Qbits$, in which Qbits, and $\Delta 1$ are nonnegative integers. When the conditions are true, the correction parameter may be set to "1." Additionally, $\lfloor \ \rfloor$ may indicate an operation of integral rounding.

Additionally, when the first estimate $estD_{i,j}$ and the second estimate $estR_{i,j}$ satisfy a predetermined condition and the correction parameter $\alpha_{i,j}$ is close to "1," accuracy of a method of compensating for a local illumination mismatch may be increased while computing expenses is reduced. The predetermined condition may be $(\lfloor |EstD_{i,j} - EstR_{i,j}| \Delta 2 \rfloor) >> Qbits_2 == 0$, in which Qbits2 and $\Delta 2$ are nonnegative integers. When the condition is true, the correction parameter may be set to "1." A common criterion, enabling detection of a situation in which the correction parameter is close to "1," may need to be considered, which may mean checking of the following inequality: $\Delta 3 \times EstR_{i,j} < EstD_{i,j} < \Delta 4 \times EstR_{i,j}$, in which $\Delta 3$, and $\Delta 4$ are preset nonnegative numbers. By considering the common criterion, the correction parameter may be set to "1."

When the similarity between the pixels of the blocks 602 and 603 and the pixels of the blocks 612 and 613 is determined to be strong, a change in illumination for the reference block 601 may be corrected using the computed correction parameter $\alpha_{i,j}$ in 706.

Correcting of illumination of pixels in the reference block may indicate correcting of a common statistical characteristic of at least one pixel in the reference block, instead of using an intensity of each of the pixels in the reference block separately.

For example, for pixels A00, A01, A10, and A11 in the current block 611, an average value for a correction parameter to be computed as described above, may be computed. An average value of a set of the pixels A00, A01, A10, and A11 may be substituted by a corrected pixel value. In another example embodiment, the pixels of the reference block may be grouped in at least one group of pixels based on an obviously determined common feature, for example, closeness of intensities, with subsequent selection of a common parameter, for example, an average value, its correction and a final replacement of a reference value of a common parameter for a selected group of pixels on a corrected value.

According to example embodiments, normally, a group of pixels, directly adjoining the reference block, may be selected as pixels located adjacent to the reference block. However, during searching of the reference block, a DV may be selected. In the DV, values of pixels in a predetermined group may not be sufficiently similar to values of pixels that correspond to the pixels in the predetermined group and that are located adjacent to the current encoded block. Moreover, values of the pixels, directly adjoining to the reference block, may differ considerably from values of the pixels of the reference block. In the above situations, a change of illumination and contrast may be incorrectly corrected.

Figure 8:
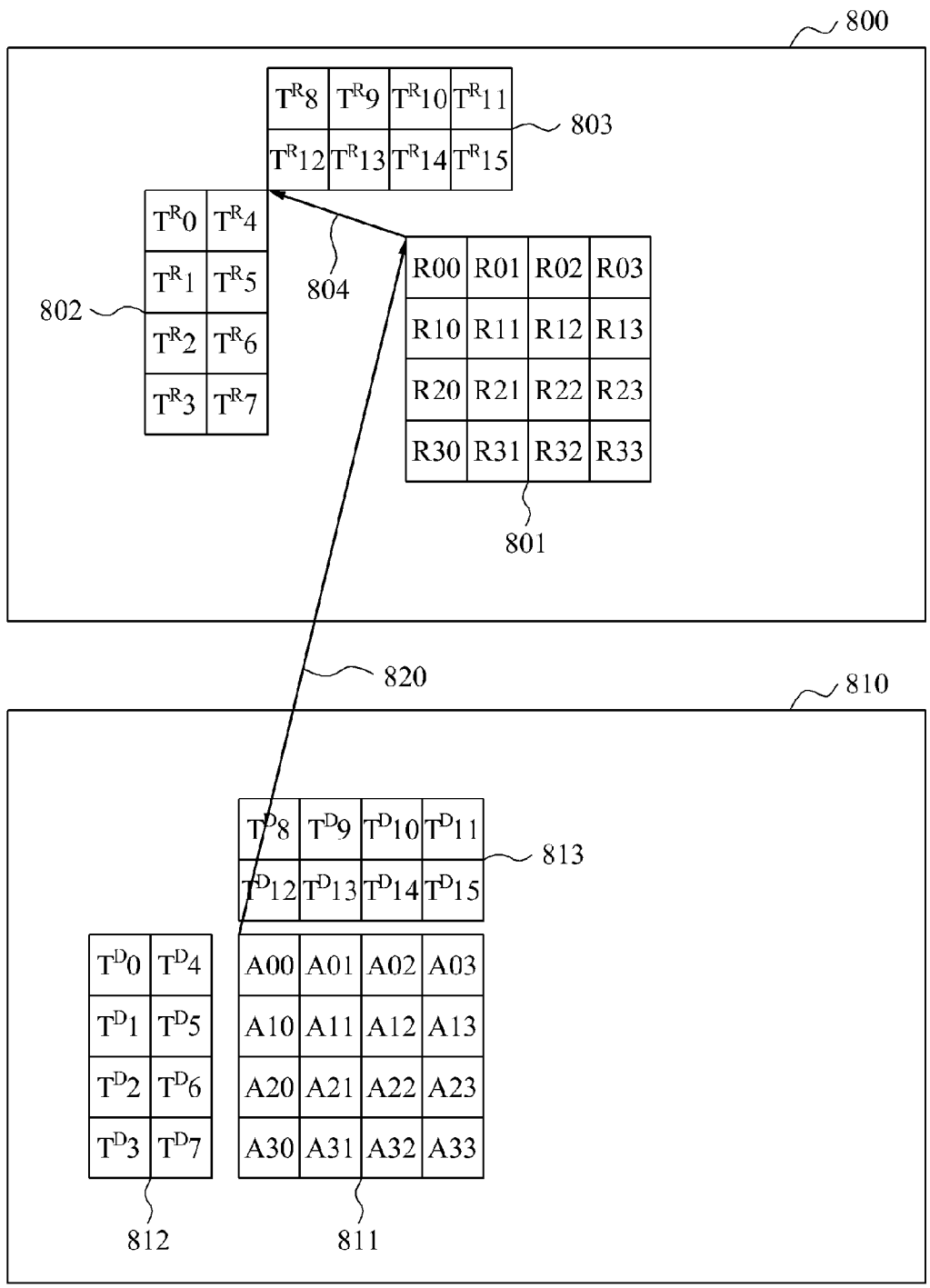
FIG. 8 illustrates a diagram of an operation of correcting a change in illumination for a reference block according to example embodiments.

To solve the above problem, use of a "floating" position for a group of pixels located adjacent to the reference block may be proposed, which will be described as shown in FIG. 8. The floating position may be associated with the reference block.

FIG. 8 illustrates a diagram of an operation of correcting a change in illumination for a reference block according to example embodiments.

Referring to FIG. 8, a DV 820 may be detected in each iteration of an operation of searching for a reference block for a current block 811 included in a current encoded frame 810. The DV 820 may point to a reference block 801 in a reference frame 800. Coordinates of a group of pixels in the reference frame 800 that is formed by pixels in blocks 802 and 803, may be determined by additionally specifying a DV 804. The DV 804 may be obtained as a result by an additional operation of estimating displacement. The DV 804 may be detected to provide a minimum value of a penalty function that defines similarity between the blocks 802 and 803 and blocks 812 and 813. The penalty function may include, for example, a mean-square error function, a function of a sum of absolute differences, a function of a sum of absolute differences for signals with a mean value of zero, and the like. The DV 804 may be implicitly detected during encoding and decoding without transmission of additional information to an output bit stream.

Logical continuation of an adaptive compensation method according to example embodiments may be modified. Normally, a group of pixels, directly adjoining to a reference block, may be selected as pixels, adjacent to the reference block. Accordingly, during searching of a reference block, a DV set with a fractional accuracy may be selected. For example, a reference block may be searched for from a predetermined intermediate spatial position allocated between integer positions of pixels. In this example, to simplify selecting of the group of the pixels adjacent to the reference block, a position of the reference block may be set to one of nearest pixel positions. The position of the reference block may be set with a smaller accuracy, rather than an accuracy of the selected DV. For example, a pixel accuracy may be used instead of a quarter-pixel accuracy for setting of vicinities that may reduce computation complexity in some implementations.

Figure 9:
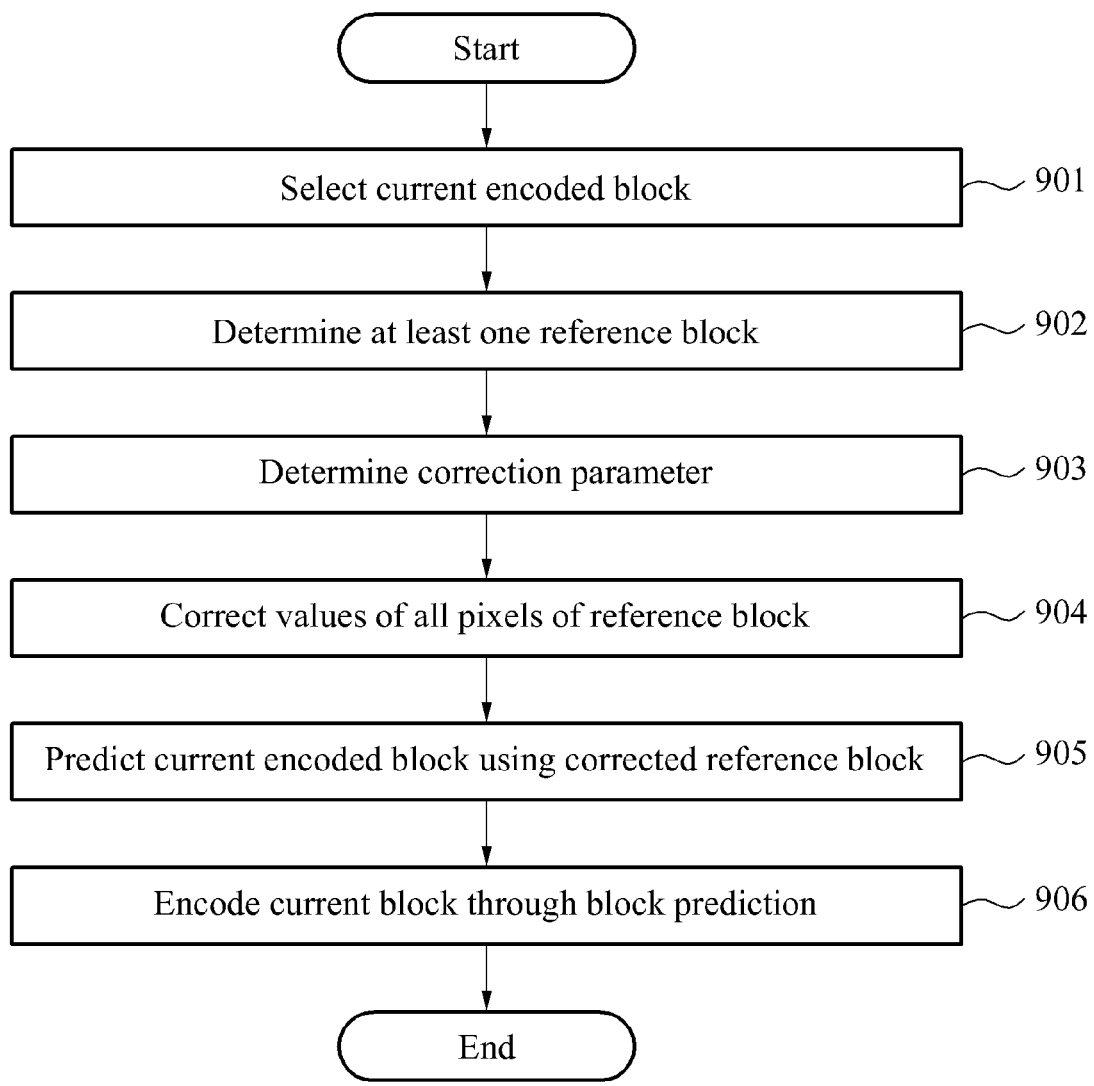
FIG. 9 illustrates a flowchart of a method of encoding a multiview video sequence based on correction of a change in illumination according to example embodiments.

FIG. 9 illustrates a flowchart of a method of encoding a multiview video sequence based on correction of a change in illumination according to example embodiments.

Referring to FIG. 9, in 901, a current encoded block belonging to a current encoding unit may be selected. In 902, at least one reference block may be determined. The at least one reference block may be used to predict a block for a current encoding unit. Pixels in the at least one reference block may be already encoded and decoded. In 903, a correction parameter used to correct a change in illumination for the reference block may be determined.

In 904, values of all pixels in the at least one reference block may be corrected based on the correction parameter. Operations 903 and 904 will be further described below.

Values of pixels restored by encoding and then decoding may be obtained from a vicinity of a current block of an encoded frame, and from a vicinity of a reference block of a reference frame. The pixels may be selected from at least one spatial area. Each of the at least one spatial area may be characterized by a preset proximity to the current block and the reference block. Predetermined areas, adjacent to the current block and the reference block, may be selected based on a type and size of spatial conversion applied further for encoding of an inter-frame difference of already decoded pixels, based on sizes of already encoded neighboring blocks, and based on logical links between the current encoded block and neighboring blocks. The logical links may be understood as specified objectively existing dependences between the current block and the neighboring blocks, and may be set, for example, by encoding. For example, the neighboring blocks and the current encoded block may be integrated together in a uniform element of encoding, for which a common DV is set, which may result in logical links. Additionally, an estimate of similarity between a set of pixels, adjacent to the current encoded block, and a set of pixels, adjacent to the reference block, may be computed. The computed estimate may be used as an additional condition for determination of using of correction of illumination of pixels of the reference block.

In 903, unreliable pixels may be excluded from consideration. The unreliable pixels may be included in an already decoded and recovered area of each of the reference frame and the encoded frame. The unreliable pixels may differ from a common sample, for example a common set, of pixels in a specified area by a preset criterion. The preset criterion may be based on analysis of distribution of values of pixels in the specified area, computation of statistical characteristics, and matching of values of all pixels determined to satisfy a condition and statistical characteristics in the specified area.

A numerical ratio between pixels of the reference block, a numerical ratio between reliable pixels located in the vicinity of the current decoded block, and a numerical ratio between reliable pixels located in the vicinity of the reference block may be determined.

The correction parameter may be computed based on the determined numerical ratios considering an initial value of the correction parameter.

A change in values of the pixels of the reference block may be estimated. When the change is estimated to be essential, the values of the pixels of the reference block may be corrected using the detected correction parameter.

In 905, the current encoded block may be predicted using a corrected reference block. In 906, the current block may be encoded through block prediction.

Figure 10:
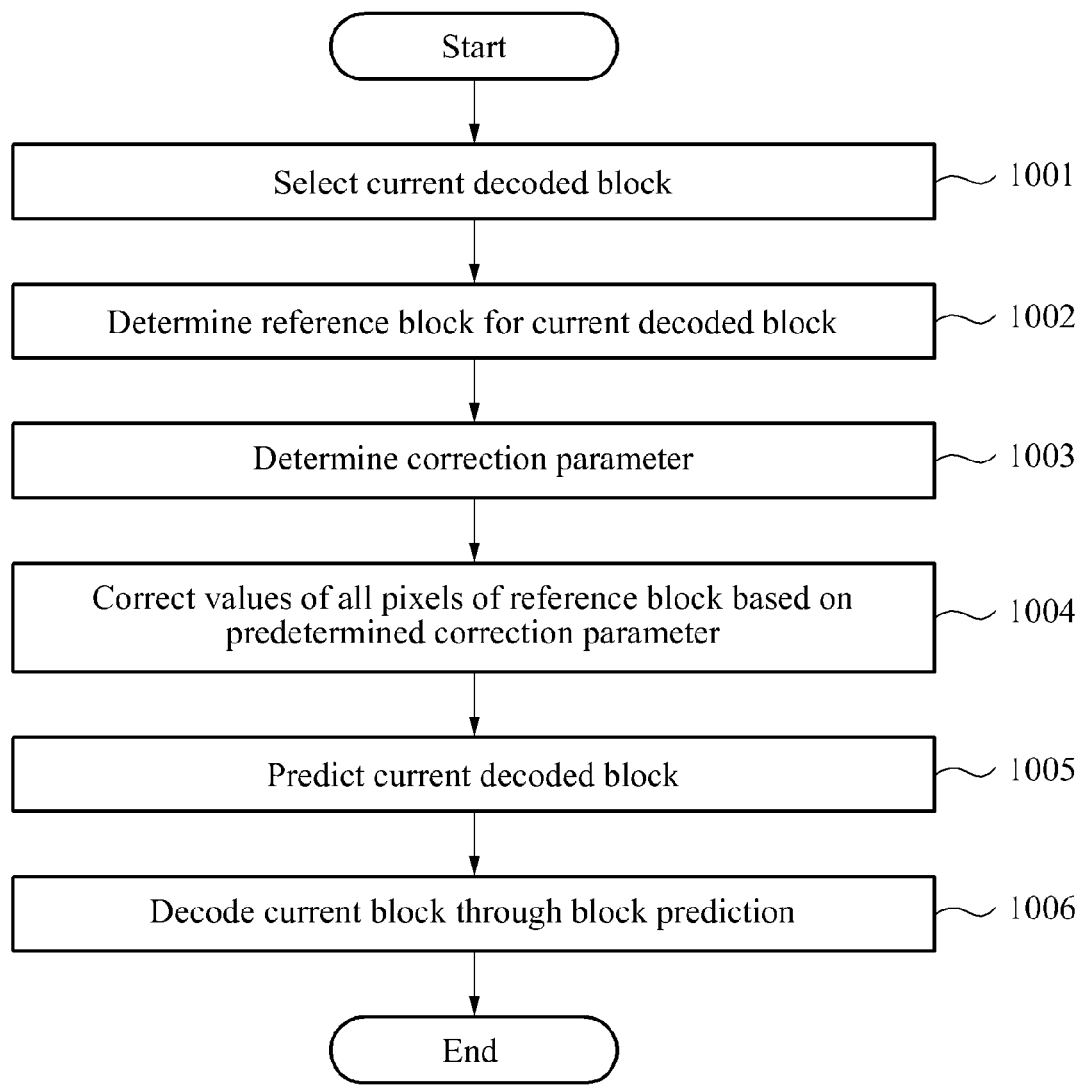
FIG. 10 illustrates a flowchart of a method of decoding a multiview video sequence based on correction of a change in illumination according to example embodiments.

FIG. 10 illustrates a flowchart of a method of decoding a multiview video sequence based on correction of a change in illumination according to example embodiments.

Referring to FIG. 10, in 1001, a current decoded block belonging to a current coding unit may be selected. In 1002, a reference block may be determined for the current decoded block. In 1003, a correction parameter used to correct a change in illumination for a found reference block may be determined. In 1004, values of all pixels of the reference block may be corrected based on a predetermined correction parameter. Operations 1003 and 1004 will be further described below.

Values of pixels that are restored by encoding and then decoding and that are located adjacent to a current block of a encoded frame, and values of pixels that are restored by encoding and then decoding and that are located adjacent to a reference block of a reference frame may be obtained. The pixels may be selected from at least one spatial area. Each of the at least one spatial area may be characterized by a preset proximity to the current block and the reference block. Predetermined areas, adjacent to the current block and the reference block may be selected based on a type and size of spatial conversion applied further for encoding of an inter-frame difference of already decoded pixels, based on sizes of already encoded blocks adjacent to the current block, and based on logical links between the current encoded block and neighboring blocks. The logical links may be understood as specified objectively existing dependences between the current block and the neighboring blocks, and may be set, for example, by encoding. For example, the neighboring blocks and the current encoded block may be integrated together in a uniform element of encoding, for which a common DV is set, which may result in logical links. Additionally, an estimate of similarity between a set of pixels, adjacent to the current encoded block, and a set of pixels, adjacent to the reference block, may be computed. The computed estimate may be used as an additional condition for determination of using of correction of illumination of pixels of the reference block.

In 1003, unreliable pixels may be excluded from consideration. The unreliable pixels may be included in an already decoded and restored area of each of the reference frame and the decoded frame. The unreliable pixels may differ from a common sample, for example a common set, of pixels in a specified area by a preset criterion. The preset criterion may be based on analysis of distribution of values of pixels in the specified area, computation of statistical characteristics, and matching of values of all checked pixels and statistical characteristics in the specified area.

A ratio between values of pixels of the reference block and the values of the pixels located adjacent to the reference block, and a ratios between restored values of pixels located adjacent to the current decoded block, and the values of the pixels located adjacent to the reference block may be determined.

A numerical ratio between the pixels of the reference block, a numerical ratio between reliable pixels located in a vicinity of the current decoded block, and a numerical ratio between reliable pixels located in a vicinity of the reference block may be determined.

The correction parameter may be computed based on the determined numerical ratios considering an initial value of the correction parameter.

A change in the values of the pixels of the reference block may be estimated. When the change is estimated to be essential, the values of the pixels of the reference block may be corrected using the detected correction parameter.

In 1005, the current decoded block may be predicted using a corrected reference block. In 1006, the current block may be decoded through block prediction.

The units described herein may be implemented using either hardware components or software components, or both. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein. Examples of program instructions include both machine code, such as produced by a compiler, and files containing higher level code that may be executed by the computer using an interpreter.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of adaptively compensating for a local illumination mismatch in inter-frame prediction during encoding and decoding of a multiview video sequence, the method being performed by a computer system and comprising:

obtaining a value of a pixel of a current encoded block included in an encoded frame, and a value of a pixel of a reference block included in a reference frame;

obtaining values of pixels restored by encoding and then decoding, from a vicinity of the current encoded block, and from a vicinity of the reference block;

excluding from consideration a pixel included in the vicinity of the current encoded block and a pixel included in the vicinity of the reference block, the excluded pixels being estimated to be unreliable for computation of a correction parameter used to correct a change in illumination based on at least one preset criterion;

determining a numerical ratio between brightness of pixels of the reference block, a numerical ratio between brightness of reliable pixels located in the vicinity of the current encoded block, and a numerical ratio between brightness of reliable pixels located in the vicinity of the reference block;

computing the correction parameter based on the determined numerical ratios considering an initial value; and estimating a change in values of pixels of the reference block, wherein, when the change in the values of the pixels is estimated to be essential, the values of the pixels of the reference block are corrected using the computed correction parameter, and wherein the computing of the correction parameter comprises computing a ratio of a first estimate $estD_{i,j}$ for position (i, j) of a pixel of the pixels in the current encoding block and a second estimate $estR_{i,j}$ for position (i, j) of a pixel of the pixels in the reference block, and computing the correction parameter to be $$\alpha_{i,j} = \frac{estD_{i,j}}{estR_{i,j}},$$

when the second estimate is not equal to zero, and setting the correction parameter $\alpha_{i,j}$ to "1," when the second estimate is equal to zero.

2. The method of claim 1, wherein a procedure comprising the determining of the numerical ratios, the computing of the correction parameter, and the estimating of the change in the values of the pixels comprises:

detecting an adjacent vicinity of the current encoded block, and an adjacent vicinity of the reference block so that pixels included in the vicinities are already restored;

computing the first estimate $estD_{i,j}$ and the second estimate $estR_{i,j}$, based on a value $T^D_k$ of a restored pixel obtained from a specified adjacent vicinity of the current encoded frame, and a value $T^R_k$ of a pixel obtained from a predefined adjacent vicinity of the reference block, k having a value of "0" to "N−1," N indicating a number of pixels obtained from the specified adjacent vicinity of the current encoded block, and the number of the pixels being equal to a number of pixels obtained from a specified adjacent vicinity of the reference block;

computing the correction parameter for each of the positions of the pixels in the reference block, based on at least one of the first estimate $estD_{i,j}$, the second estimate $estR_{i,j}$, a value $R_{i,j}$ of a pixel of the reference block, the value $T^D_k$ of the restored pixel, and the value $T^R_k$ of the pixel; and correcting the values of the pixels of the reference block, using the correction parameter.

3. The method of claim 2, wherein a procedure comprising the computing of the at least one of the first estimate $estD_{i,j}$ and the second estimate $estR_{i,j}$, and the computing of the correction parameter comprises:

setting an initial value BaseD for the first estimate, and an initial value BaseR for the second estimate so that both the initial values BaseD and BaseR are nonnegative or nonpositive numbers;

computing a weight coefficient $W_k(i,j)$ based on an intensity of a pixel of the reference block in a position (i,j), and an intensity of a pixel with an index k from a preset adjacent vicinity of the reference block;

computing the first estimate based on $estD_{i,j}$=BaseD+ $\Sigma_{k=0 \ldots N-1} W_k(i,j) \times T_k^D$;

computing the second estimate based on $estR_{i,j}$=BaseR+ $\Sigma_{k=0 \ldots N-1} W_k(i,j) \times T_k^R$;

$$\alpha_{i,j} = \frac{estD_{i,j}}{estR_{i,j}}$$

$\alpha_{i,j}$; and correcting illumination of the reference block by multiplication of the value $R_{i,j}$ of each of the pixels of the reference block on a corresponding correction parameter $\alpha_{i,j}$, when the correction parameter $\alpha_{i,j}$ is not equal to "1".

4. The method of claim 2, wherein a position of the adjacent vicinity of the current encoded block, and a position of the adjacent vicinity of the reference block are detected adaptively instead of being initially set.

5. The method of claim 2, wherein the computing of at least one of the first estimate $estD_{i,j}$ and the second estimate $estR_{i,j}$ comprises performing preliminary resampling down of some pixels located in a preset adjacent vicinity of the current encoded block, and some pixels located in the preset adjacent vicinity of the reference block, wherein the part of the pixels located in the preset adjacent vicinity of the current encoded block corresponds to the part of the pixels located in the preset adjacent vicinity of the reference block.

6. The method of claim 2, further comprising:

estimating a possible change of each of the values of the pixels in the reference block, based on a preset numerical criterion, and the first estimate $estD_{i,j}$ and the second estimate $estR_{i,j}$, the change being determined to be essential or unessential, depending on a computed value of a numerical criterion.

7. A method of encoding a multiview video sequence based on adaptive compensation of a local illumination mismatch in inter-frame prediction, an encoded frame being represented as a set of non-overlapping areas of pixels used as units of coding, and the method being performed by a computer system and comprising:

selecting a current encoded block belonging to a current coding unit;

determining a reference block in a reference frame, the reference block being used for generation of block-prediction for the current encoded block, and pixels of the reference block being already completely encoded and decoded;

computing a correction parameter used to correct a change in illumination of the reference block;

correcting the illumination, by adjusting values of all pixels of the reference block, based on the determined correction parameter;

generating the block-prediction for the current encoded block, using the reference block with the corrected illumination; and decoding the current encoded block, through the generated block-prediction, wherein a procedure comprising the computing of the correction parameter and the correcting of the illumination comprises:

obtaining values of pixels restored by encoding and then decoding, from a vicinity of the current encoded block of the encoded frame, and from a vicinity of the reference block;

excluding from consideration a pixel included in the vicinity of the current encoded block and a pixel included in the vicinity of the reference block, the pixels being estimated to be unreliable for computation of the correction parameter used to correct the change in the illumination by at least one preset criterion;

computing the correction parameter, based on an initial value and using only a reliable pixel; and estimating a change in values of pixels of the reference block, wherein, when the change in values of pixels is estimated to be essential, the values of the pixels of the reference block are corrected using the computed correction parameter, and wherein the computing of the correction parameter comprises computing a ratio of a first estimate $estD_{i,j}$ for position (i, j) of a pixel of the pixels in the current encoding block and a second estimate $estR_{i,j}$ for position (i, j) of a pixel of the pixels in the reference block, and computing the correction parameter to be $$\alpha_{i,j} = \frac{estD_{i,j}}{estR_{i,j}},$$

when the second estimate is not equal to zero, and setting the correction parameter $\alpha_{i,j}$ to "1," when the second estimate is equal to zero.

8. The method of claim 7, wherein the selecting of the current encoded block comprises determining a size of the current encoded block, a relative allocation of the vicinity of the current encoded block and the vicinity of the reference block, and a size of each of the vicinity of the current encoded block and the vicinity of the reference block, and
wherein pixels of the current encoded block are used to compute the correction parameter based on a decoding parameter of the current coding unit.

9. The method of claim 8, wherein each of the size of the current encoded block, the relative allocation of the vicinity of the current encoded block and the vicinity of the reference block, and the size of each of the vicinity of the current encoded block and the vicinity of the reference block are determined based on a type of applied decorrelated conversion, and
wherein the pixels of the reference block are used to compute the correction parameter based on the decoding parameter of the current coding unit.

10. The method of claim 7, wherein the determining of the reference block comprises selecting a single reference frame from among all reference frames, the selected reference frame being used to search for the reference block, using a predetermined rule, and information on the selected reference frame not being encoded.

11. The method of claim 7, wherein the determining of the reference block comprises detecting a motion vector based on a similarity function that additionally considers mismatches in average levels of illumination of the current encoded block and a candidate for the reference block.

12. The method of claim 7, wherein the encoding of the current encoded block comprises:

encoding an additional syntactic element for the current coding unit, to which the current encoded block belongs; and determining, based on a value of the additional syntactic element, whether a change in a value of a pixel of a reference block of the current coding unit is essential or unessential.

13. The method of claim 7, wherein the encoding of the current encoded block comprises:

encoding a single additional syntactic element for each subblock of the current coding unit, the single additional syntactic element having a unique index of a reference frame in the current coding unit; and determining, based on a value of the additional syntactic element, whether the change in the values of the pixels of the reference block is essential or unessential.

14. The method of claim 7, wherein the correction parameter is not encoded during the encoding of the current encoded block.

15. A method of decoding a multiview video sequence based on adaptive compensation of a local illumination mismatch in inter-frame prediction, a decoded frame being represented as a set of non-overlapping areas of pixels used as units of coding, and the method being performed by a computer system and comprising:

selecting a current decoded block belonging to a current coding unit;

determining a reference block for the current decoded block, the reference block being included in a reference frame;

computing a correction parameter used to correct a change in illumination of the determined reference block;

correcting the illumination, by adjusting values of all pixels of the reference block, based on the determined correction parameter;

generating a block-prediction for the current decoded block, using the reference block with the corrected illumination; and decoding the current decoded block through the generated block-prediction, wherein a procedure comprising the computing of the correction parameter and the correcting of the illumination comprises:

obtaining values of pixels restored by encoding and then decoding, from a vicinity of the current decoded block of the decoded frame, and from a vicinity of the reference block;

excluding from consideration a pixel included in the vicinity of the current decoded block and a pixel included in the vicinity of the reference block, the pixels being estimated to be unreliable for computation of the correction parameter used to correct the change in the illumination by at least one preset criterion;

computing the correction parameter, based on found numerical ratios based on pixel brightnesses considering an initial value; and correcting values of pixels of the reference block, using the computed correction parameter, when a change in the values of the pixels of the reference block is estimated to be essential wherein the computing of the correction parameter comprises computing a ratio of a first estimate $estD_{i,j}$ for position (i, j) of a pixel of the pixels in the current encoding block and a second estimate $estR_{i,j}$ for position (i, j) of a pixel of the pixels in the reference block, and computing the correction parameter to be $$\alpha_{i,j} = \frac{estD_{i,j}}{estR_{i,j}},$$

when the second estimate is not equal to zero, and setting the correction parameter $\alpha_{i,j}$ to "1," when the second estimate is equal to zero.

16. The method of claim 15, wherein the selecting of the current decoded block comprises determining a size of the current decoded block, a relative allocation of the vicinity of the current decoded block and the vicinity of the reference block, and a size of each of the vicinity of the current decoded block and the vicinity of the reference block, and
wherein pixels of the current decoded block are used to compute the correction parameter based on a decoding parameter of the current coding unit.

17. The method of claim 16, wherein each of the size of the current decoded block, the relative allocation of the vicinity of the current decoded block and the vicinity of the reference block, and the size of each of the vicinity of the current decoded block and the vicinity of the reference block are determined based on a type of applied decorrelated conversion, and
wherein the pixels of the reference block are used to compute the correction parameter.

18. The method of claim 15, wherein the selecting of the current decoded block comprises determining the size of the current decoded block based on decoded information in an input bitstream.

19. The method of claim 15, wherein the decoding of the current decoded block comprises:
decoding an additional syntactic element for the current coding unit, to which the current decoded block belongs; and
determining, based on a value of the additional syntactic element, whether a change in a value of a pixel of a reference block of the current coding unit is essential or unessential.

20. The method of claim 15, wherein the decoding of the current decoded block comprises decoding an additional correction parameter used to correct the change in the illumination, with usage of the correction parameter, the additional correction parameter being placed in an input bitstream, and being computed based on the obtained values of pixels.

* * * * *